US010692377B1

(12) United States Patent
Kentley-Klay

(10) Patent No.: US 10,692,377 B1
(45) Date of Patent: Jun. 23, 2020

(54) ENHANCED TRAVEL MODES FOR VEHICLES

(71) Applicant: Zoox, Inc., Menlo Park, CA (US)

(72) Inventor: Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 218 days.

(21) Appl. No.: 15/727,234

(22) Filed: Oct. 6, 2017

(51) Int. Cl.
| *G08G 1/16* | (2006.01) |
| *G05D 1/00* | (2006.01) |
| *G05D 1/02* | (2020.01) |
| *G08G 1/00* | (2006.01) |
| *B62D 15/02* | (2006.01) |

(52) U.S. Cl.
CPC ......... *G08G 1/161* (2013.01); *B62D 15/0255* (2013.01); *G05D 1/0011* (2013.01); *G05D 1/0088* (2013.01); *G05D 1/0212* (2013.01); *G05D 1/0297* (2013.01); *G08G 1/22* (2013.01); *B60W 2754/10* (2020.02); *G05D 2201/0213* (2013.01)

(58) Field of Classification Search
None
See application file for complete search history.

(56) References Cited

U.S. PATENT DOCUMENTS

| 2008/0161986 A1* | 7/2008 | Breed | G08G 1/163 701/23 |
| 2009/0248222 A1 | 10/2009 | McGarry et al. | |
| 2010/0256852 A1* | 10/2010 | Mudalige | G08G 1/163 701/24 |
| 2014/0297116 A1* | 10/2014 | Anderson | H02K 5/12 701/37 |
| 2016/0039459 A1 | 2/2016 | Spero et al. | |
| 2016/0171894 A1* | 6/2016 | Harvey | G05D 1/0088 701/23 |
| 2017/0345309 A1* | 11/2017 | Bostick | G08G 1/166 |
| 2018/0082590 A1* | 3/2018 | MacNeille | G08G 1/0133 |
| 2019/0184893 A1* | 6/2019 | Sorokin | B60Q 1/503 |

OTHER PUBLICATIONS

Aschim, H., "A Mode for Every Road: Changing Your Car's Abilities with the Push of a Button", Road and Track, retrieved Oct. 6, 2017, from <<http://www.roadandtrack.com/new-cars/car-technology/a26716/adaptive-suspension-continuously-controlled-damping-lincoln-mxk/>>, 7 pages.

* cited by examiner

*Primary Examiner* — Lail A Kleinman
(74) *Attorney, Agent, or Firm* — Lee & Hayes, P.C.

(57) ABSTRACT

A method for operating a fleet of vehicles may include determining a first set of parameters for operating a first vehicle as it travels to a destination, and determining a second set of parameters for operating a second vehicle. Consumption of the first set of parameters by the first vehicle may cause the first vehicle to accelerate, alter shocks and/or suspensions, and/or move into a free lane. Consumption of the second set of parameters by the second vehicle may cause the second vehicle to remain outside of a drive envelope of the first vehicle, between the first vehicle and the particular destination.

20 Claims, 8 Drawing Sheets

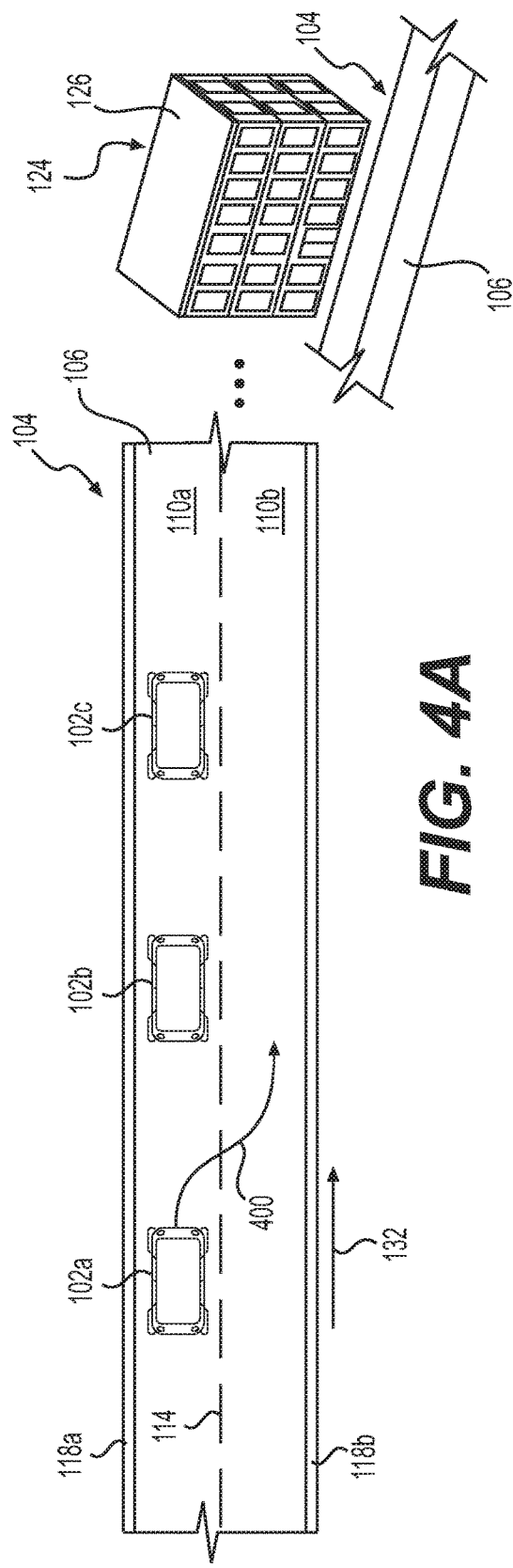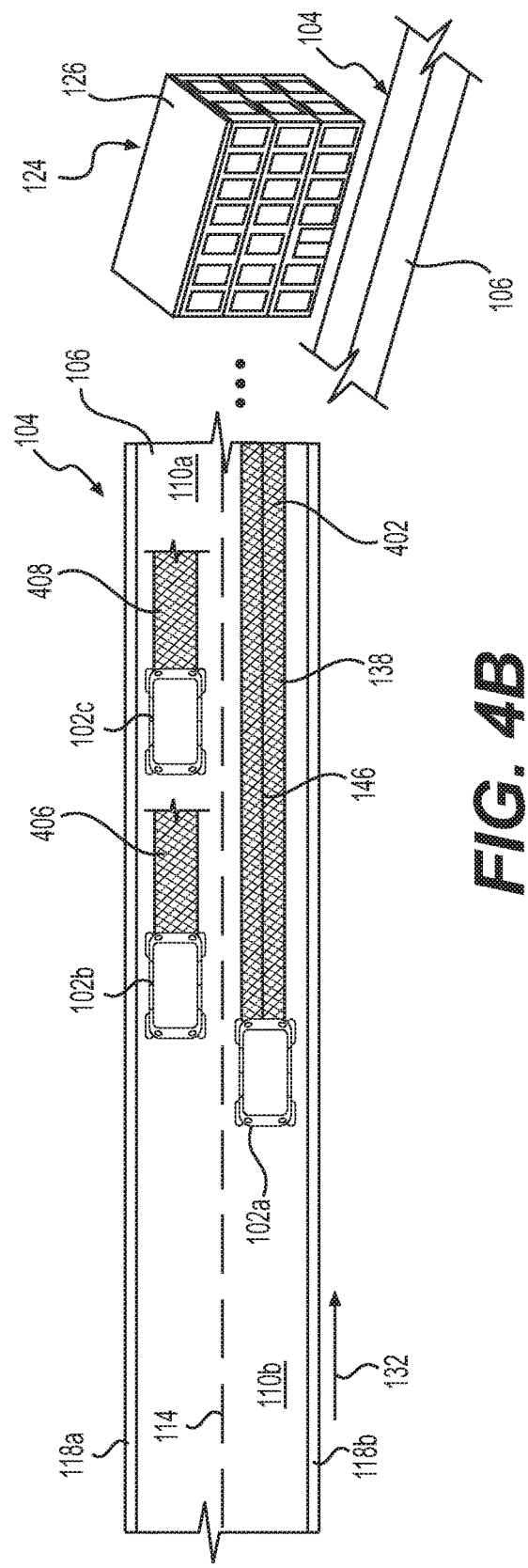

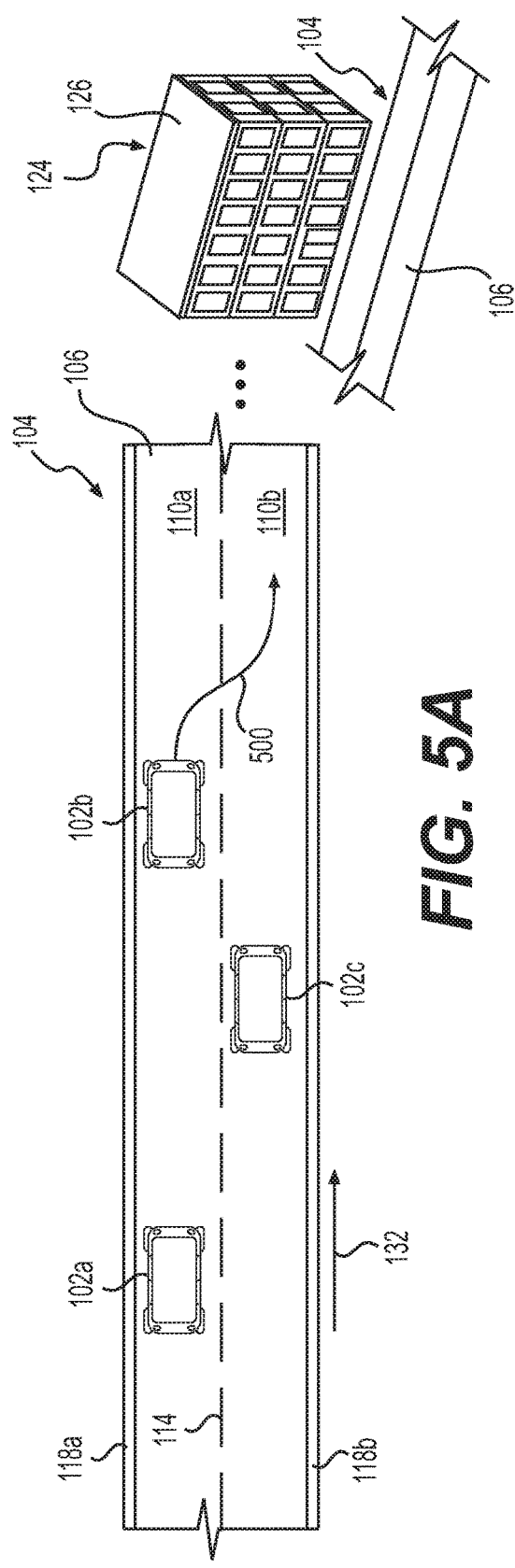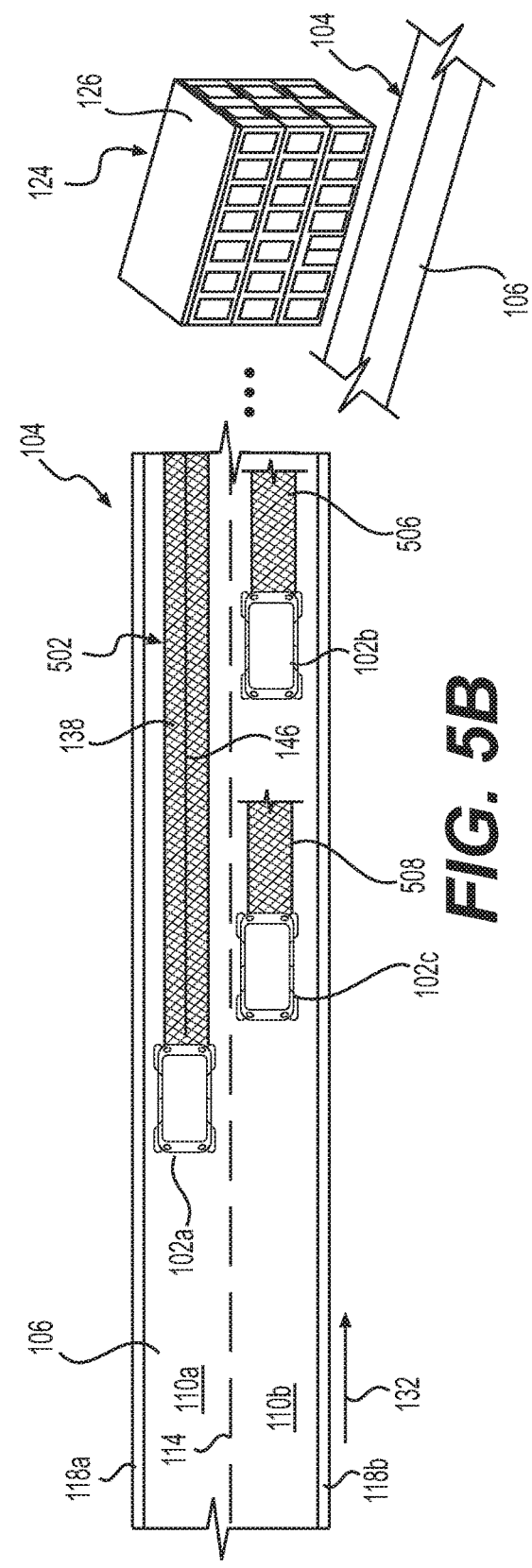

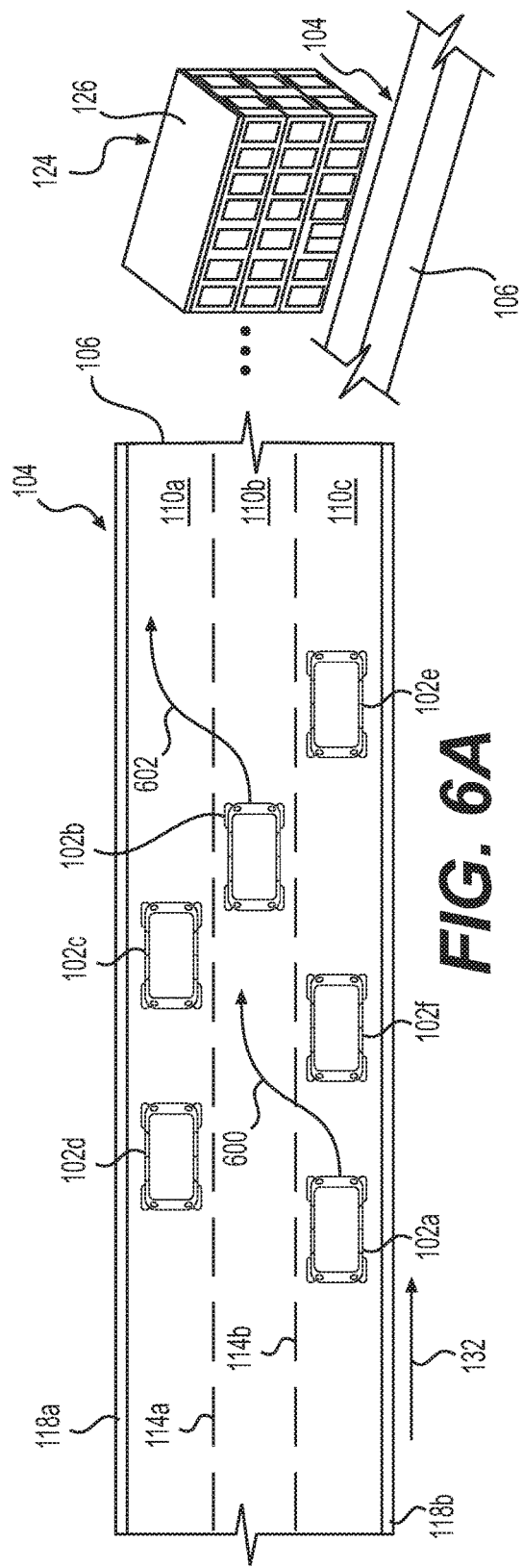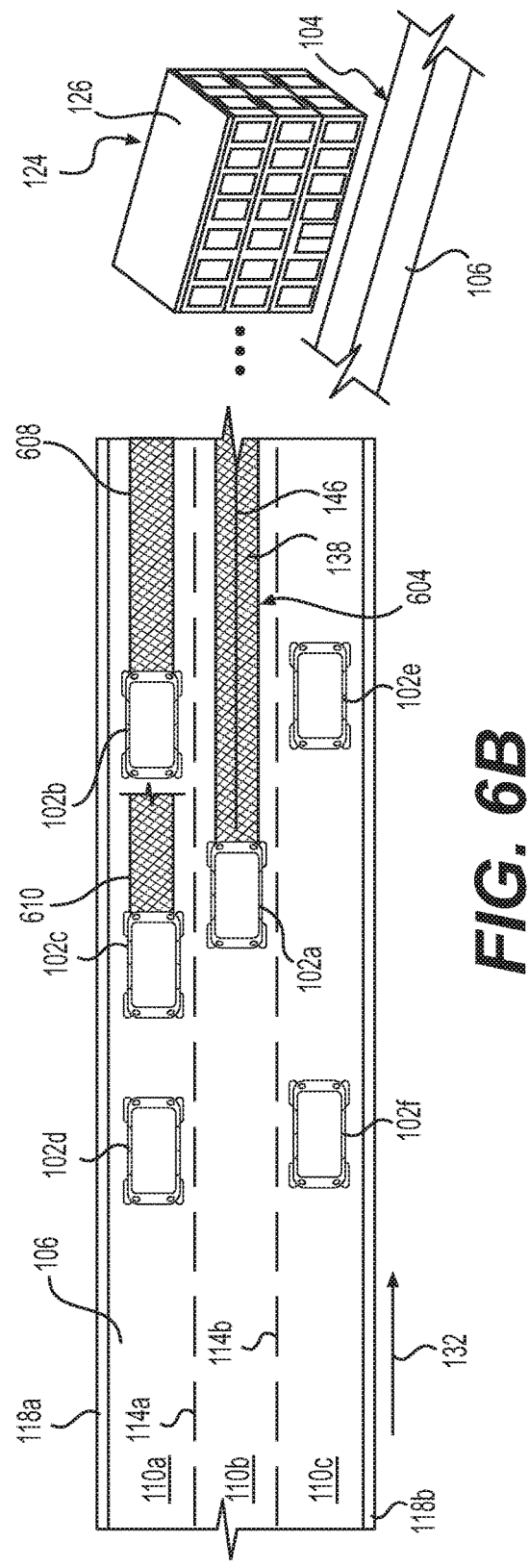

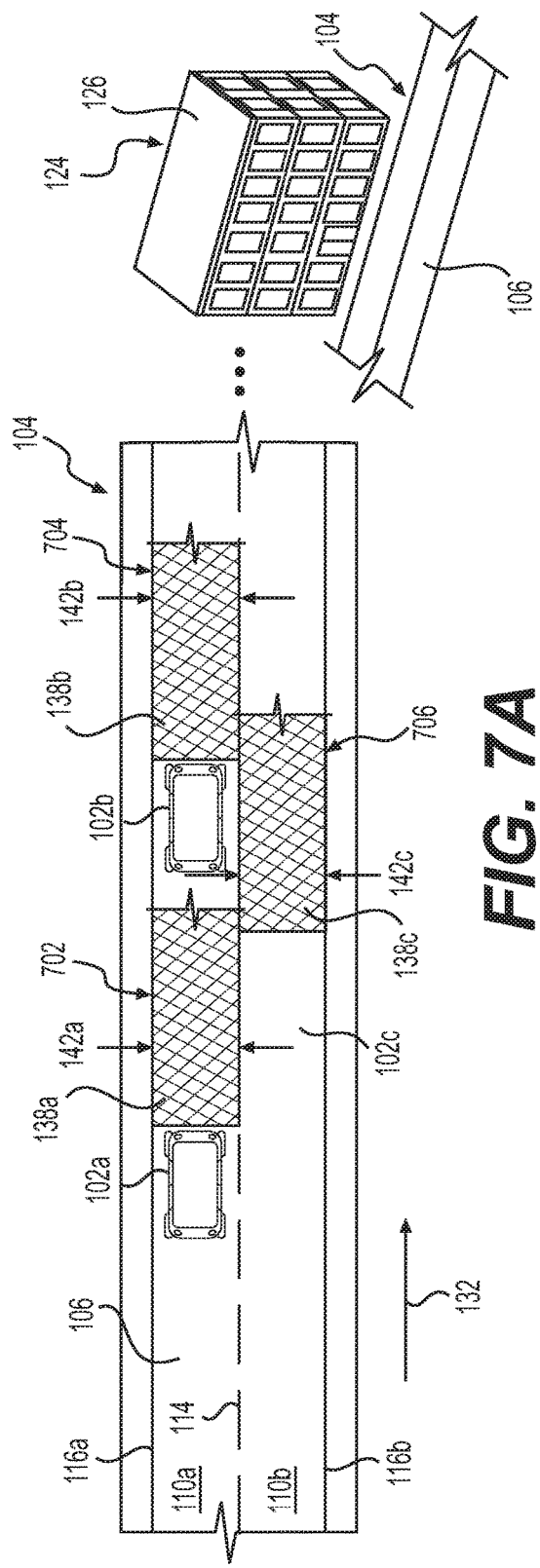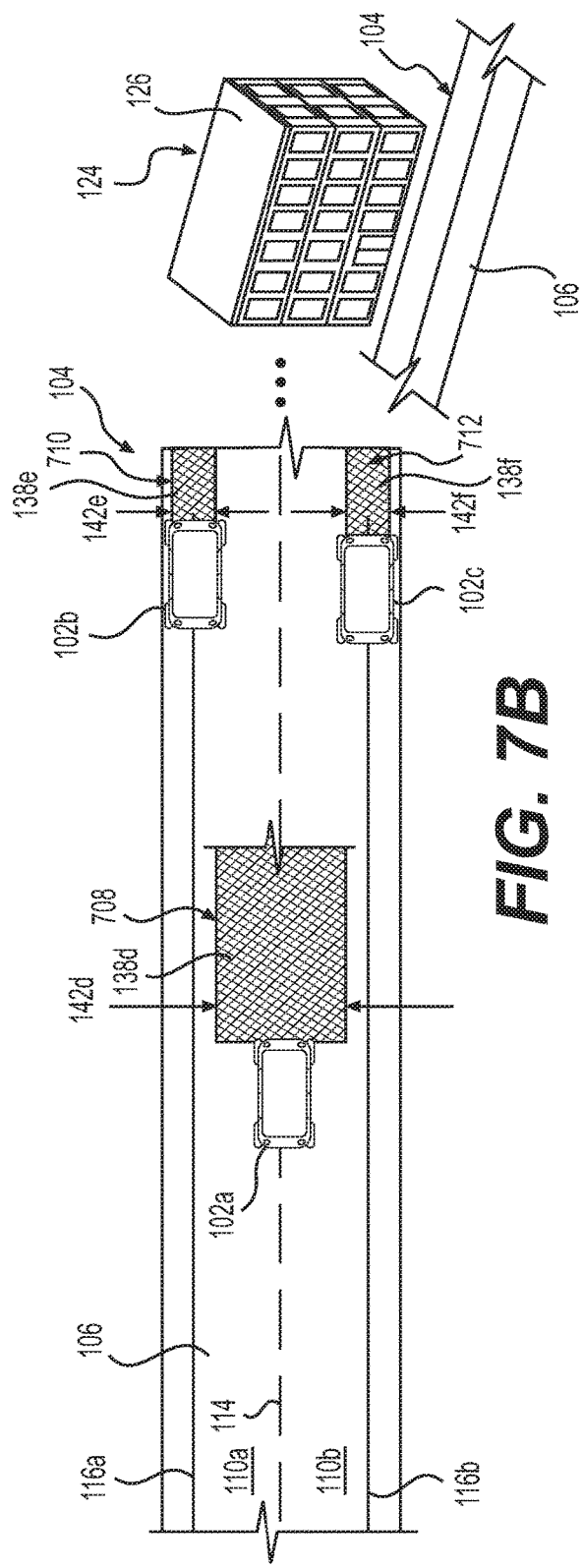

ENHANCED TRAVEL MODES FOR VEHICLES

BACKGROUND

Vehicles may be used to transport people between different locations. Normal driving procedures may include maneuvering the vehicle within the confines of a lane, maneuvering around turns in the road, safely passing through intersections, as well as complying with traffic laws. In most scenarios, all vehicles traveling on a road may be given equal priority in order to reach their respective destinations. In such scenarios, all vehicles may be controlled so as to maximize the efficiency of traffic flow on the road and/or on portions of a road network.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

As shown in FIG. 1, such a vehicle may include a preferential travel input device configured to enable a passenger of the vehicle to request a prioritized path or other preferential travel benefits when traveling to a particular destination.

FIGS. 4a and 4b are schematic views of a portion of an example road network in which example vehicles are traveling along respective paths. In such examples, at least one of the vehicles may be traveling along a prioritized path to a particular destination.

FIGS. 5a and 5b are additional schematic views of a portion of an example road network in which example vehicles are traveling along respective paths.

FIGS. 6a and 6b are further schematic views of a portion of an example road network in which example vehicles are traveling along respective paths.

FIGS. 7a and 7b are still further schematic views of a portion of an example road network in which example vehicles are traveling along respective paths.

DETAILED DESCRIPTION

Figure 1:
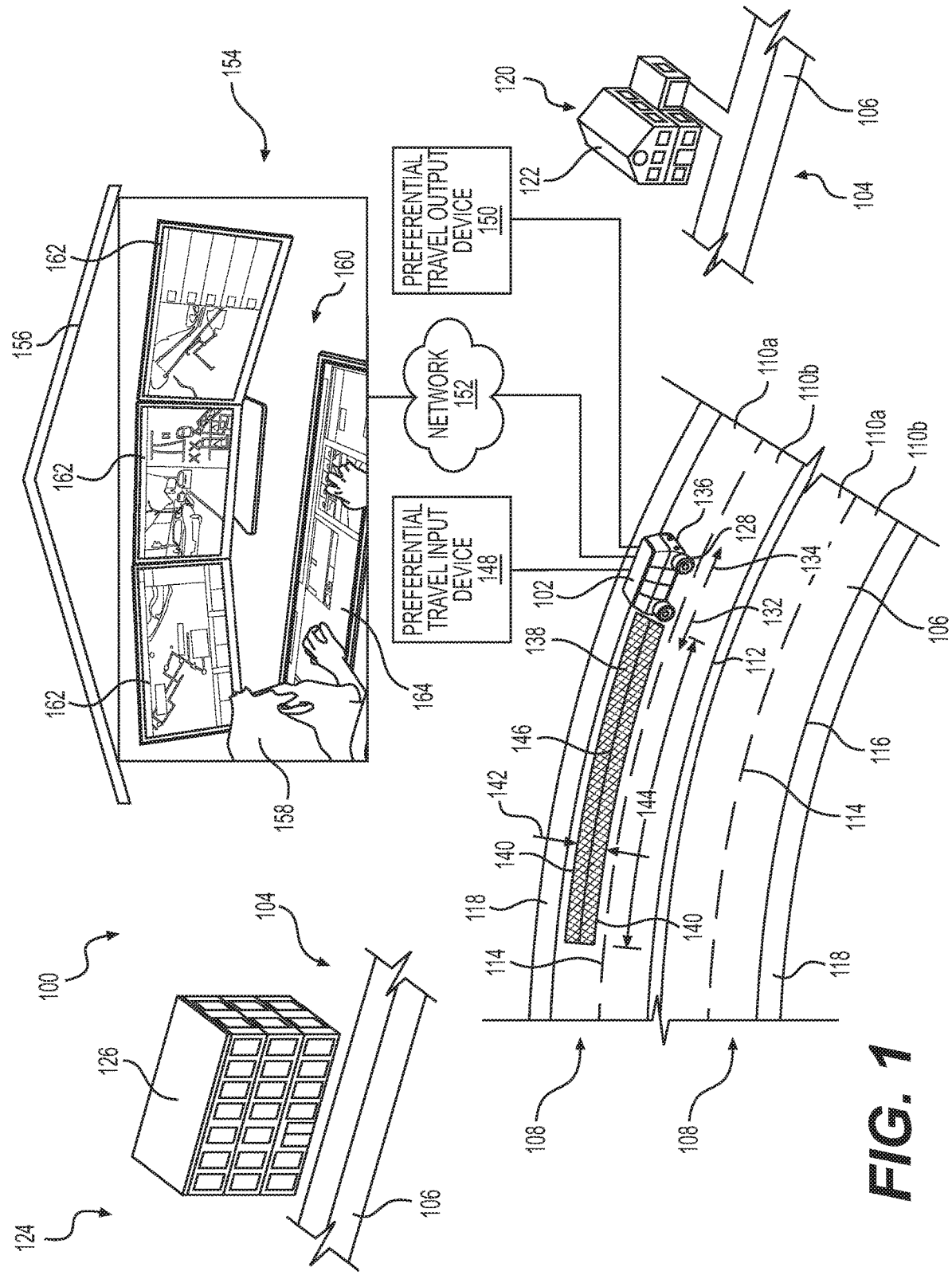
FIG. 1 is a schematic diagram of an example environment through which an example vehicle travels along a road of a road network.

This disclosure is generally directed to facilitating interaction between a vehicle, such as a driverless vehicle, a remotely located vehicle control system, one or more other vehicles, and/or one or more other devices (e.g., traffic signals, signs, barriers, bridges, etc.). As mentioned above, such a vehicle traveling on a road of a road network, from a first location to a particular destination at a second location, may require or request preferential travel for a variety of reasons. For example, the vehicle and/or a passenger thereof may be part of a travel program or other premium service in which prioritized or preferential travel is a benefit. A passenger of the vehicle may also request preferential travel in emergency situations or in other time-sensitive situations. In such circumstances, for example, the passenger may provide a touch input, a voice input, a gesture input, and/or other input via a preferential travel input device of the vehicle. The preferential travel input device may be operably connected to a vehicle controller configured to process such an input, and to provide a signal indicative of such an input to the remotely located vehicle control system. The input may additionally or alternatively be provided to the vehicle controller by one or more applications operable on a mobile phone, tablet, laptop computer, or other electronic device, and in such examples, such electronic devices may comprise a preferential travel input device. In still further examples, such preferential travel may be a preset user setting and/or a subscription-based service associated with the vehicle and/or the user. In such examples, the vehicle may automatically be granted preferential travel once the passenger enters the vehicle and/or once the vehicle is turned on. Additionally, the passenger may be granted preferential travel upon paying a subscription fee and/or upon paying a one-time fee upon requesting preferential travel.

As will be described in greater detail below, during normal operations, the vehicle may travel and/or otherwise operate according to a set of nominal operating parameters or parameters, and such operating parameters may be adjusted if preferential travel is requested by a passenger of the vehicle. For example, upon receiving a request from the passenger, the vehicle controller may provide a signal indicative of a request for preferential travel to the remote vehicle control system via one or more wireless networks. Based at least partly on such a request, the remote vehicle control system may determine a set of parameters that includes modifications to the nominal operating parameters currently governing operation of the vehicle from which the request for preferential travel originated (e.g., a "requesting vehicle"). Such a set of modified parameters may include, for example, a new/modified speed threshold below which the requesting vehicle may be permitted and, in some situations, required to operate, a new/modified drive line along which the requesting vehicle may be permitted and, in some situations, required to travel, a new/modified drive envelope along which or within which the requesting vehicle may be permitted and, in some situations, required to travel, new/modified traffic rules (e.g., rules governing vehicle operation with regard to stop signs, traffic lights, no passing zones, school zones, or other areas) with which the requesting vehicle must abide, and/or other new/modified rules or limitations for operating the requesting vehicle within the road network.

In some examples, the set of parameters may include road network data and/or other information that may be used by a vehicle controller of the requesting vehicle to generate a drive envelope that defines a prioritized path along which the requesting vehicle may travel between the vehicle's current location in the road network to the desired destination. Alternatively, such a set of new/modified parameters may identify, define, and/or include such a prioritized path. Such a prioritized path may include a path in which none of the additional vehicles, or a limited number of additional vehicles, in the road network are disposed within a drive envelope of the requesting vehicle as the requesting vehicle travels to the destination. In some examples, the prioritized path may be selected and/or otherwise determined based at least in part on the fact that no other vehicles are present within such a drive envelope. Additionally or alternatively, the additional vehicles in the road network may be actively controlled to avoid the trajectory of the requesting vehicle. In such examples, the signal provided to the remote vehicle control system by the vehicle controller may include sensor information and/or other information indicative of the requesting vehicle's current location. The signal may also include an address, global positioning coordinates, and/or other indication of the desired destination. The signal may further include an identifier uniquely identifying the requesting vehicle, an additional identifier uniquely identifying one or more passengers of the requesting vehicle, and/or other information related to the request. Further, in any of the examples described herein, such a "drive envelope" may be defined as a preferred area on which the vehicle should drive to reach a destination having an extent along a direction of travel associated with a distance the vehicle may traverse in a fixed period of time (e.g., according to a receding horizon technique) or a specified finite distance. For example, such a drive envelope may extend a length along a drive segment, line, and/or route along which the requesting vehicle may be controlled to travel for approximately 10 seconds. Alternatively, such a drive envelope may extend a fixed distance, e.g. 500 feet, in the direction of a line and/or route along which the requesting vehicle may be controlled to travel. Such a "drive envelope" may comprise a drive line indicating an ideal line for the vehicle to follow within the drive envelope. As used herein, a trajectory may be a selected subset of the "drive envelope" in which the vehicle actually traverses, or is selected to traverse. It is understood that the finite period of time and finite distance noted above are merely examples and, in further embodiments, such finite periods of time and finite distances may be greater than or less than those noted above.

In such examples, and based at least in part on the request, one or more computing devices of the remote vehicle control system may determine a first set of parameters associated with the requesting vehicle as well as one or more additional sets of parameters associated with the remaining vehicles in the road network. The first set of parameters may require that the requesting vehicle travel along a prioritized path from the vehicle's current location to the particular destination. Such a prioritized path may be configured such that none of the additional vehicles in the road network are disposed within one or more drive envelopes (e.g., a series of consecutive drive envelopes) of the requesting vehicle as the requesting vehicle travels to the destination. The additional sets of parameters may require that the remaining vehicles in the road network remain outside of the prioritized path of the requesting vehicle. For example, a second set of parameters provided to a second vehicle traveling in the road network may require that the second vehicle remain outside of the trajectory of the requesting vehicle as the requesting vehicle travels to a destination. Further, in some examples the signal sent to the remote vehicle control system by the requesting vehicle may identify an area, zone, radius, and/or other location that is to be avoided by the additional vehicles in the road network (e.g., a temporary non-entry zone) when the requesting vehicle is disposed proximate and/or within such a location. In such examples, such locations may be identified in the one or more additional sets of parameters determined by the remote vehicle control system.

Additionally, while some embodiments of the present disclosure relate to centralized control examples in which signals are provided to a remote vehicle control system and in which the remote vehicle control system determines one or more sets of parameters based at least in part on such signals, in other embodiments, such a remote vehicle control system may be omitted. For example, in additional decentralized control embodiments the vehicle controller of the requesting vehicle may provide a signal indicative of a request for preferential travel to the respective vehicle controllers of one or more of the additional vehicles located in the road network via the one or more wireless networks. In such embodiments, the vehicle controller of the requesting vehicle may determine a first set of parameters including, among other things, a prioritized path for the requesting vehicle to travel along. As noted above, such a prioritized path may include one or more drive envelopes and/or trajectories, and none of the additional vehicles may be disposed within or along such drive envelopes and/or trajectories as the requesting vehicle travels along the prioritized path to the destination. Additionally, based at least partly on such a request, the vehicle controllers of the additional vehicles may determine additional respective sets of parameters for operating the corresponding vehicles. Such additional sets of parameters require that each of the additional vehicles remain outside of the one or more trajectories of the prioritized path as the requesting vehicle travels to the destination. In some examples, one or more of the additional vehicles and/or owners or passengers of the additional vehicles may be compensated for operating in accordance with such additional respective sets of parameters and/or for otherwise facilitating the preferential travel of the requesting vehicle. For example, as part of requesting preferential travel and/or as a requirement for being granted preferential travel, a passenger of the requesting vehicle may pay a corresponding fee. In such examples, at least a portion of the fee may be distributed to an owner or passenger of one or more of the remaining vehicles within the road network whose travel is hindered, de-prioritized and/or otherwise affected by the requesting vehicle being granted preferential or prioritized travel. The techniques and systems described herein may be implemented in a number of ways. Example implementations are provided below with reference to the figures.

FIG. 1 is a schematic diagram of an example environment 100 through which an example vehicle 102 travels. The example environment 100 includes a road network 104 including a plurality of example roads 106 having two pairs 108 of lanes 110a, 110b separated by a median or double-yellow line 112. For example, a first lane 110a, a second lane 110b, and/or one or more additional lanes may be at least partially defined by a lane dividing line 114 and/or a lane boundary line 116. The example road 106 also includes shoulders 118 located on opposite sides of the road 106. FIG. 1 also shows an example geographic location 120 associated with a departure location including a structure 122, such as a house or building, and an example destination 124 also including a structure 126, such as a house or building. The road network 104 provides a number of roads 106 defining a path between the geographic location 120 and the destination 124, and FIG. 1 shows an enlarged view of a portion of an example road 106. The road network 104 may include a number of features, such as curves, intersections with cross-roads, crosswalks, traffic signs, traffic lights, railroad crossings, bridges, traffic circles, directional arrows, etc.

As shown in FIG. 1, the example vehicle 102 may travel through the example environment 100 via the road network 104 according to a path extending from the geographic location 120 to the particular destination 124. For the purpose of illustration, the vehicle 102 may be a driverless vehicle, such as an autonomous vehicle configured to operate according to a Level 5 classification issued by the U.S.

National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to completion of the trip, including all parking functions, it may not include a driver. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 shown in FIG. 1 is an automobile having four wheels 128 and respective tires for each of the wheels 128. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the example vehicle 102 has four wheels 128, the systems and methods described herein may be incorporated into vehicles having fewer or a greater number of wheels, tires, and/or tracks. The example vehicle 102 has four-wheel steering and may operate generally with equal performance characteristics in all directions, for example, such that a first end 130 of the vehicle 102 is the front end of the vehicle 102 when travelling in a first direction 132, and such that the first end 130 becomes the rear end of the vehicle 102 when traveling in the opposite, second direction 134, as shown in FIG. 1. Similarly, a second end 136 of the vehicle 102 is the front end of the vehicle 102 when travelling in the second direction 134, and such that the second end 136 becomes the rear end of the vehicle 102 when traveling in the opposite, first direction 132. These example characteristics may facilitate greater maneuverability, for example, in small spaces or crowded environments, such as parking lots and urban areas.

In the example shown in FIG. 1, and as will be explained in greater detail below, the vehicle 102 may use various sensors and a vehicle controller to autonomously operate through the environment 100 along a path via the road network 104. For example, the vehicle controller may be configured to determine a drive envelope 138 defined by virtual boundaries 140 within which the vehicle 102 may travel. For example, the drive envelope 138 may have a variable envelope width 142 in the width direction of the vehicle 102, and a variable envelope length 144 extending in the direction of travel of the vehicle 102. In some examples, the virtual boundaries 140 of the drive envelope 138 may be determined based at least in part on sensor data received from sensors associated with the vehicle 102 and/or road network data received by the vehicle 102 via a road network data store, as explained in more detail herein. In some examples, the vehicle 102 may travel along a drive line 146 within the drive envelope 138. In such examples, the drive line 146 may extend approximately centrally through the drive envelope 138, and the drive envelope 138 may define at least part of the path along which the vehicle 102 travels to reach the particular destination 124. For example, the path along which the vehicle 102 travels may be approximately as wide as the vehicle 102 and/or the envelope width 142. In some examples, the drive line 146 may be, or may be used to determine, a trajectory along which the vehicle 102 may follow to achieve the desired path. Such a trajectory may be determined by, substantially simultaneously, generating a plurality of trajectories and selecting one of the trajectories which is best able to achieve the path. In such examples, the trajectory may be calculated in accordance with a receding horizon technique such that the trajectory only provides commands for a particular time window (e.g. less than 10 seconds) and is recalculated at a certain frequency (e.g. 10 Hz, 30 Hz, etc.).

The vehicle 102 may also include a preferential travel input device 148 and a preferential travel output device 150. Shown schematically in FIG. 1, the preferential travel input device 148 and the preferential travel output device 150 may comprise separate respective devices or components of the vehicle 102. Alternatively, the preferential travel input device 148 and the preferential travel output device 150 may comprise a single input/output device. The preferential travel input device 148 may be configured to assist a passenger with requesting preferential travel to the destination 124 and, in particular, with requesting a set of parameters governing operation of the vehicle 102 as the vehicle travels to the destination 124. Such a set of parameters may include, for example, road network data, global positioning information, traffic rules, and/or other information that may be utilized as inputs to a vehicle controller of the vehicle 102. In such examples, the vehicle controller of the vehicle 102 may generate and/or otherwise determine a drive envelope including a drive line 146. As noted above, in any of the examples described herein, such a drive line 146 may be, or may be used to determine, one or more trajectories (e.g., a series of consecutive trajectories) along which the vehicle 102 may travel. In this way, the drive line 146 and/or the one or more trajectories may define a prioritized path extending from the vehicle 102 to the destination 124. In additional examples, the set of parameters may define and/or otherwise include a drive envelope that includes and/or otherwise defines the prioritized path.

In some examples, the preferential travel input device 148 may comprise a button, switch, knob, lever, or other component of the vehicle 102 configured to receive a manual, physical, or touch input from a passenger. Such a preferential travel input device 148 may also comprise one or more touch screen displays, physical keyboards, virtual keyboards (e.g., a keyboard displayed via a touch screen or other display device), or other user interface devices of the vehicle 102 configured to receive such input. In still further examples, the preferential travel input device 148 may comprise one or more microphones configured to receive voice commands or other audible input from the passenger, and/or one or more cameras configured to receive visual or gesture input. In such examples, the vehicle controller may include voice recognition functionality, gesture recognition functionality, or other such capabilities in order to process inputs received via the preferential travel input device 148. In any of the examples described herein, the preferential travel output device 150 may comprise a speaker, a display (e.g., a touch screen display), a heads-up display, and/or other such device configured to display, announce, and/or otherwise output at least part of a prioritized path along which the vehicle 102 may travel. The preferential travel output device 150 may include any of the components described above with respect to the preferential travel input device 148. The preferential travel input device 148 and the preferential travel output device 150 may be operably and/or otherwise connected to the vehicle controller of the vehicle 102. It is also understood that such inputs and/or outputs may be provided by one or more applications operable on a mobile phone, tablet, laptop computer, or other electronic device that are in communication (wirelessly or otherwise) with the vehicle 102, and in such examples, such electronic devices may comprise a preferential travel input device 148 and/or a preferential travel output device 150.

In some examples, the preferential travel input device 148 may be configured to receive an input from a passenger of the vehicle 102 indicative of a request for preferential travel, and the preferential travel input device 148 may be configured to generate and/or send a signal to the vehicle controller of the vehicle 102 containing information indicative of the request, at least partly in response to such an input. In such examples, the vehicle controller of the vehicle 102 may be communicatively and/or otherwise connected to a network 152, and the vehicle controller may provide a corresponding signal and/or request to a remote vehicle control system 154 via the network 152. In any of the examples described herein, a request for preferential travel may comprise a request for a prioritized drive envelope and/or path extending from the vehicle 102 to a particular destination 124 that is accessible via the road network 104 on which the vehicle 102 is traveling. In response, the vehicle controller of the vehicle 102 may request assistance from the remote vehicle control system 154 and, in particular, may request the determination of a set of modified parameters governing operation of the vehicle 102 as the vehicle 102 travels to the particular destination 124. Such a set of modified parameters may include, for example, an alteration of at least one of the nominal operating parameters currently governing operation of the vehicle 102. In another example, such a set of modified parameters may include at least one additional operating parameter not included in the nominal operating parameters. In a further example, such a set of modified parameters may omit one or more of the nominal operating parameters. In some examples, the vehicle 102 may be a part of a fleet of vehicles in communication with the remote vehicle control system 154 via the network 152. In such examples, the signal provided by the vehicle controller of the vehicle 102 may include sensor information and/or other information indicative of a current location of the vehicle 102. The signal may also include an address, global positioning coordinates, and/or other indication of the desired destination 124, and such information may be provided by the passenger via the preferential travel input device 148. The signal may further include an identifier uniquely identifying the requesting vehicle 102, an additional identifier uniquely identifying one or more passengers of the requesting vehicle 102, and/or other information related to the request.

As will be explained in further detail below, at least partly in response to such a request, the remote vehicle control system 154 may determine a first set of modified parameters governing operation of the vehicle 102. The first set of modified parameters may include a modified (e.g., prioritized) drive envelope 138 comprising a modified (e.g., prioritized) drive line 146. As noted above, such a drive line 146 may comprise one or more trajectories (e.g., a series of consecutive trajectories) defining a prioritized path from the vehicle 102 to the destination 124. In any of the examples described herein, the first set of modified parameters may include road network data and/or other information that may be used by the vehicle controller of the vehicle 102 to determine such a drive envelope and/or prioritized path. For example, the first set of modified parameters may also identify portions of the road network 104 which may or may not be used by the requesting vehicle 102 as the vehicle 102 travels to the destination 124. At least partly in response to such a request, the remote vehicle control system 154 may also determine a second set of modified parameters governing operation of a second vehicle of the fleet of vehicles. Such a second set of parameters may include a modified (e.g., a reduced priority) drive envelope 138 comprising a modified (e.g., a reduced priority) drive line 146. Such a drive line 146 may comprise one or more trajectories (e.g., a series of consecutive trajectories) defining a second path (e.g., a path of reduced priority) along which the second vehicle of the fleet of vehicles travels such that the vehicle 102 providing the request may have priority in reaching the destination 124 along the road network 104. Alternatively, the second set of parameters may include road network data and/or other information that may be used by the vehicle controller of the second vehicle to determine such a second path (e.g., by rerouting the second vehicle to take alternate routes allowing the vehicle 102 to have less traffic on the prioritized route). In such examples, the second set of parameters may be at least partly more restrictive than the first set of parameters. For example, in accordance with the second set of parameters, the second vehicle and/or a remainder of the plurality of vehicles may be permitted and, in some situations, required to clear at least one of the first lane 110*a* or the second lane 110*b* of the road 106 such that the vehicle 102 providing the request may travel along a prioritized path (i.e., a travel path in which none of the additional vehicles in the road network are disposed within the drive envelope or along one or more trajectories of the requesting vehicle 102 as the requesting vehicle 102 travels to the particular destination 124. In any of the examples described herein, one or more of the vehicles 102 may form a caravan and/or a motorcade as the vehicles 102 travel together in the road 106. Further, in any of the examples described herein, one or more of the vehicles 102 may include an input/output interface or other component that enables dynamic short range communication between the respective vehicles 102. For example, such components may enable a first vehicle 102 to communicate a first set of modified parameters, a prioritized drive envelope 138, a prioritized drive line 146, one or more trajectories, a prioritized path, and/or any other information described herein to one or more additional vehicles 102 traversing the road network 104 having corresponding input/output interface components. Such additional vehicles 102 may also be configured to communicate information back to the first vehicle 102, using the corresponding input/output interface components, in response to information received from the first vehicle 102.

In some examples, and as shown schematically in FIG. 1, the remote vehicle control system 154 may be located at a remote control center 156, and one or more human operators 158 may also be located at the remote control center 156 in order to operate the remote vehicle control system 154. In some examples, one or more of the operators 158 may not be human. For example, they may be computer systems leveraging artificial intelligence, machine learning, and/or other decision making strategies in order to operate the remote vehicle control system 154. In the example shown, the operator 158 may interact with one or more vehicles 102 in the fleet of vehicles via an operator computing device 160. The operator computing device 160 may include one or more displays 162 configured to provide the operator 158 with data related to operation of the vehicle 102, a subset of the fleet of vehicles, and/or the fleet of vehicles. For example, the display(s) 162 may be configured to show data related to sensor signals received from the vehicles 102, data related to the road network 104, requests for preferential travel received from the vehicles 102, and/or additional data or information to facilitate providing travel paths, vehicle information, directions, and/or other information or assistance to the vehicles 102. In addition, the operator computing device 160 may include an operator input device 164 configured to allow the operator 158 to provide information to one or more of the vehicles 102, for example, in the form of signals providing guidance to the vehicles 102. The operator input device 164 may include one or more of a touch-sensitive screen, a stylus, a mouse, a dial, a keyboard, a keypad, and/or a gesture-input system configured to translate gestures performed by the operator 158 into input commands for the computing device 160. As explained in more detail below, the remote vehicle control system 154 may provide one or more of the vehicles 102 with a set of modified parameters that may be used by the local vehicle controllers of the respective vehicles 102 to govern operation of the respective vehicle 102. It is understood, however, that any of the methods and/or operations described herein with respect to the remote vehicle control system 154 may be performed by one or more of the respective vehicle controllers of the vehicles 102 traversing the road network 104. In such examples, the remote vehicle control system 154 may be omitted and, for example, the various sets of parameters, drive envelopes, paths, drive lines, trajectories, and/or other operational parameters described herein may be determined and/or provided by at least one of the vehicle controllers.

Figure 2:
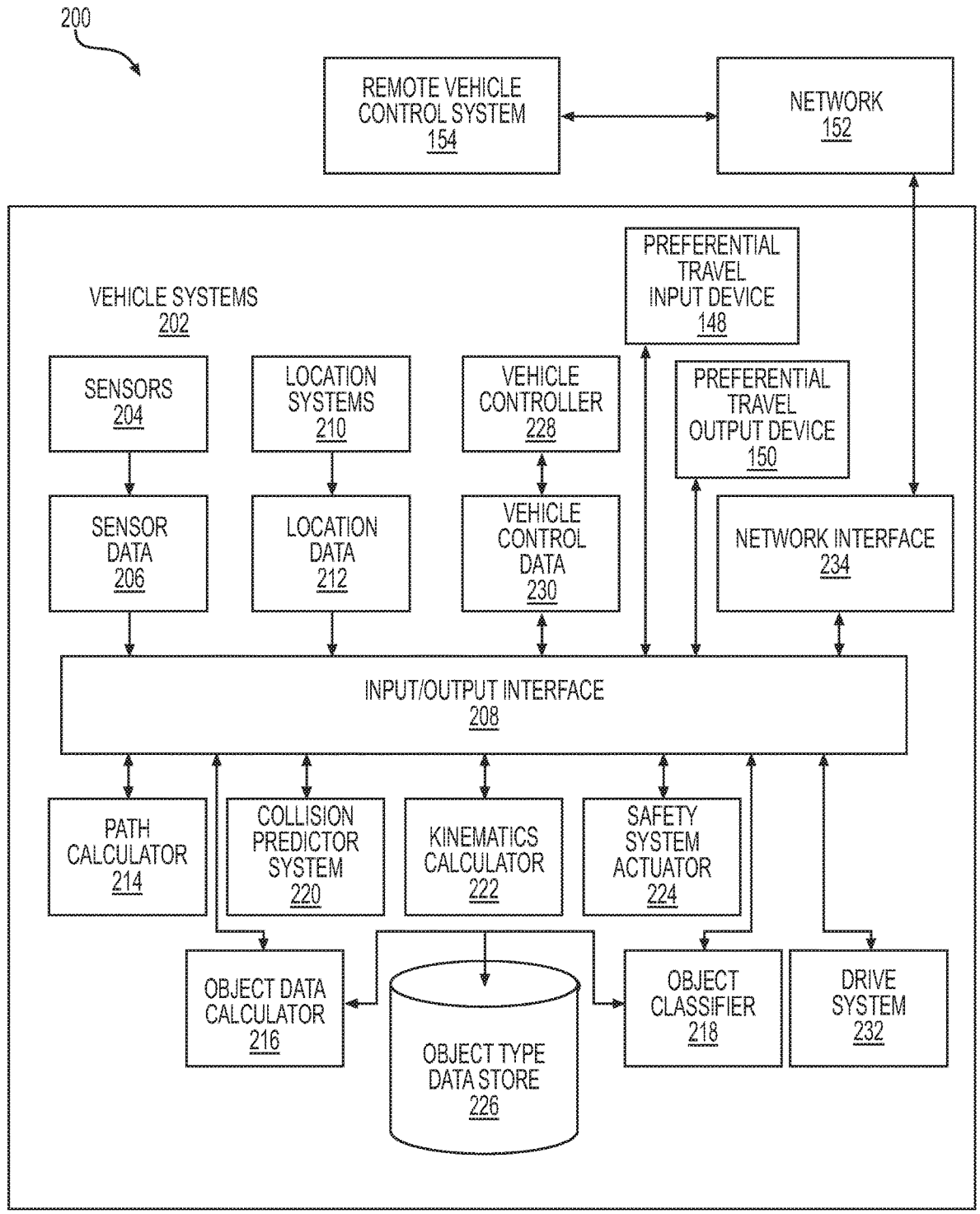
FIG. 2 is a block diagram illustrating an example vehicle system architecture.

FIG. 2 is a block diagram of an example architecture 200 including vehicle systems 202 for controlling operation of the systems that provide data associated with operation of the vehicle 102, and that control operation of the vehicle 102. Any of the components described with respect to FIG. 2 may be incorporated into one or more of the vehicles 102 described herein.

In various implementations, the architecture 200 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof. The processor(s) may comprise a component of the vehicle controller described herein. In some examples, the processor(s) may include one or more field-programmable gate arrays, application-specific integrated circuits, microprocessors, and/or other processor components.

The example architecture 200 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally, a non-transitory, computer readable memory may include storage media or memory media, such as flash memory (e.g., solid state memory), magnetic or optical media (e.g., a disk) coupled to the architecture 200 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example architecture 200 shown in FIG. 2, the example vehicle systems 202 include a plurality of sensors 204, for example, configured to sense movement of the vehicle 102 through the environment 100, sense environmental data, such as the ambient temperature, pressure, and humidity, and/or sense objects in the environment 100 surrounding the vehicle 102. In some examples, the sensors 204 may include sensors configured to identify a location on a map (e.g., a geographic location of the vehicle 102). The sensors 204 may include, for example, one or more light detection and ranging sensors (LIDAR), one or more cameras, one or more radio detection and ranging sensors (RADAR), one or more sound navigation and ranging sensors (SONAR) (e.g., ultrasonic transducers), one or more microphones for sensing sounds in the environment 100, such as sirens from law enforcement and emergency vehicles, and other sensors related to the operation of the vehicle 102. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The sensors 204 may also include, for example, inertial measurement units (IMUs), accelerometers, and gyroscopes. The sensors 204 may be configured to provide sensor data 206 representative of the sensed objects and signals to the vehicle systems 202 via, for example, an input/output (I/O) interface 208. Other types of sensors and sensor data are contemplated. As noted above, in some examples one or more of the I/O interfaces 208 described herein, and/or the vehicle system 202 generally, may include an antenna, transmitter, transceiver, and/or other components configured to enable dynamic short range communication between the vehicles 102. In particular, such components may enable the transfer of signals and/or information between the vehicles 102 as the vehicles traverse the road network 104.

The example vehicle systems 202 also include location systems 210 configured to receive location information, including position and orientation data (e.g., a local position or local pose (e.g., a location and orientation)) from the sensors 204 and/or external sources, and provide location data 212 to other portions of the vehicle systems 202 via the I/O interface 208. The external sources may include global satellites for facilitating operation of a global positioning system (GPS) and/or a wireless network for communicating and receiving information related to the vehicle's location, such as map data. The location systems 210 may also include sensors configured to assist with navigation of the vehicle 102, such as wheel encoders for sensing the rotation of the wheels 128, inertial navigation sensors, such as gyroscopes and/or accelerometers, and/or cameras for obtaining image data for dead-reckoning navigation (e.g., visual odometry), a Bayesian filtering schema (e.g. SLAM), bundle adjustment, or the like.

The example vehicle systems 202 also include one or more of a path calculator 214, an object data calculator 216, an object classifier 218, a collision predictor system 220, a kinematics calculator 222, and a safety system actuator 224. The vehicle systems 202 may be configured to access one or more data stores including, but not limited to, an object type data store 226. The object type data store 226 may include data representing object types associated with object classifications for objects detected in the environment 100.

The example vehicle systems 202 shown in FIG. 2 also include a vehicle controller 228 configured to receive vehicle control data 230, and based on the vehicle control data 230, communicate with a drive system 232 (e.g., a steering system, a propulsion system, suspension system, and/or a braking system) to control operation of the vehicle 102. For example, the vehicle control data 230 may be derived from data received from one of more of the sensors 204 and one or more of the path calculator 214, the object data calculator 216, the object classifier 218, the collision predictor system 220, the kinematics calculator 222, and the safety system actuator 224, and control operation of the drive system 232, so that operation and maneuvering of the vehicle 102 is executed.

In some examples, the path calculator 214 may comprise a software and/or hardware component of the vehicle controller 228, and the path calculator 214 may be configured to generate data representative of a trajectory of the vehicle 102, for example, using data representing a location of the vehicle 102 in the environment 100 and other data, such as local pose data, that may be included in the location data 212. In some examples, the path calculator 214 may also be configured to determine projected trajectories predicted to be executed by the vehicle 102. The path calculator 214 may, in some examples, be configured to calculate data associated with a predicted motion of an object in the environment 100, and may determine a predicted object path associated with the predicted motion of the object. In some examples, the object path may include the predicted object path. In some examples, the object path may include a predicted object trajectory. In some examples, the path calculator 214 may be configured to predict more than a single predicted object trajectory. For example, the path calculator 214 may be configured to predict multiple object trajectories based on, for example, probabilistic determinations or multi-modal distributions of predicted positions, trajectories, and/or velocities associated with an object. In any of the examples described herein, the path calculator 214 may configured to generate and/or otherwise determine a path along or within which the vehicle 102 will travel, and such a path may be determined by the path calculator 214 based at least partly on and/or in accordance with a set of parameters provided by the remote vehicle control system 154. In particular, in some examples the path calculator 214 may be configured to determine a drive envelope 138 defining and/or including a drive line 146 along or within which the vehicle 102 will travel to the destination 124. Such a drive line 146 may indicate an ideal line for the vehicle 102 to follow and may further comprise one or more trajectories (e.g., a series of consecutive trajectories), and the drive line 146 and/or such trajectories may define a prioritized path extending from the vehicle 102 to the destination 124.

In some examples, the object data calculator 216 may be configured to provide data representative of, for example, one or more of the location of an object in the environment 100 surrounding the vehicle 102, an object track associated with the object, and an object classification associated with the object. For example, the object data calculator 216 may be configured to receive data in the form of sensor signals received from one or more of the sensors 204 and determine data representing one or more of the location in the environment 100 of the object, the object track, and the object classification.

In some examples, the object classifier 218 may be configured to access data from the object type data store 226, which may be configured to store data representing object types, such as, for example, a species of an object classification, a subclass of an object classification, and/or a subset of an object classification. The object classifier 218, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses or subsets. For example, a "sedan" that is parked may have an additional subclass designation of being "static" or "being dynamic" if moving.

In some examples, the collision predictor system 220 may be configured to use the data representing the object type, the data representing the trajectory of the object, and/or the data representing the trajectory of the vehicle 102, to predict a collision between the vehicle 102 and the object.

In some examples, the kinematics calculator 222 may be configured to determine data representing one or more scalar and/or vector quantities associated with motion of objects in the environment 100, including, but not limited to, velocity, speed, acceleration, deceleration, momentum, local pose, and/or force. Data from the kinematics calculator 222 may be used to compute other data, including, but not limited to, data representing an estimated time to impact between an object and the vehicle 102, and data representing a distance between the object and the vehicle 102. In some examples, the kinematics calculator 222 may be configured to predict a likelihood that other objects in the environment 100 (e.g., cars, motorcyclists, pedestrians, cyclists, and animals) are moving in an alert or controlled state, versus an un-alert or uncontrolled state. For example, the kinematics calculator 222 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment 100. For example, if the objects are moving erratically or without appearing to adjust to the presence or motion of other objects in the environment 100, this may be an indication that the objects are either uncontrolled or moving in an unpredictable manner. This may be inferred based on sensor data received over time that may be used to estimate or predict a future location of the object relative to a current or future trajectory of the vehicle 102.

In some examples, the safety system actuator 224 may be configured to activate one or more safety systems of the vehicle 102 when a collision is predicted by the collision predictor 220 and/or the occurrence of other safety related events, such as, for example, an emergency maneuver by the vehicle 102, such as hard braking or a sharp acceleration. The safety system actuator 224 may be configured to activate an interior safety system (e.g., including seat belt pre-tensioners and/or air bags), an exterior safety system (e.g., including warning sounds and/or warning lights), the drive system 232 configured to execute an emergency maneuver to avoid a collision, and/or any combination thereof. For example, the drive system 232 may receive data for causing a steering system of the vehicle 102 to change the travel direction of the vehicle 102, and a propulsion system of the vehicle 102 to change the speed of the vehicle 102 to alter the trajectory of vehicle 102 from an initial trajectory to a trajectory for avoiding a collision.

The vehicle systems 202 may operate according to the following example. Data representing a trajectory of the vehicle 102 in the environment 100 may be received by the vehicle controller 228. Object data associated with an object in the environment 100 surrounding the vehicle 102 may be calculated. Sensor data 206 from one or more of the sensors 204 may be used to calculate the object data. The object data may include data representing the location of the object in the environment 100, an object track associated with the object, such as whether the object is stationary or moving, and an object classification associated with the object, such as whether the object is another vehicle, a pedestrian, a cyclist, an animal, or a stationary object. In some examples, the object data calculator 216, based on the object data, may be used to determine data representing the object's location in the environment 100, data representing whether the object is moving, and data representing a classification associated with the object.

In some examples, the path calculator 214 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 220 may be used to predict a collision between the vehicle 102 and an object in the environment 100 based on the object type, whether the object is moving, the trajectory of the vehicle 102, the predicted path of the object obtained from the path calculator 214. For example, a collision may be predicted based in part on the object type due to the object moving, the trajectory of the object being in potential conflict with the trajectory of the vehicle 102, and the object having an object classification that indicates the object is a likely collision threat.

In some examples, the safety system actuator 224 may be configured to actuate one or more portions of a safety system of the vehicle 102 when a collision is predicted. For example, the safety system actuator 224 may activate one or more safety systems of the vehicle 102, such as, for example, one or more of the interior safety systems, one or more of the exterior safety systems, and one or more of the components of the drive system 232 (e.g., the steering system, the propulsion system, and/or the braking system) via the vehicle controller 228. In some examples, the vehicle controller 228 may determine that the interior safety system will be activated based on some action of an object in the environment 100, and the vehicle control data 230 may include information configured to cause the vehicle controller 228 to activate one or more functions of the interior safety system, the exterior safety system, and the drive system 232.

As shown in FIG. 2, the example vehicle systems 202 also include a network interface 234 configured to provide a communication link between the vehicle 102 and the remote vehicle control system 154. For example, the network interface 234 may be configured to allow data to be exchanged between the vehicle 102, other devices coupled to the network 152, such as other computer systems, other vehicles 102 in the fleet of vehicles, and/or with the remote vehicle control system 154. For example, the network interface 234 may enable wireless communication between numerous vehicles and/or the remote vehicle control system 154. In various implementations, the network interface 234 may support communication via a wireless general data networks, such as a Wi-Fi network. For example, the network interface 234 may support communication via telecommunications networks, such as, for example, cellular communication networks, satellite networks, and the like. Further, the vehicle controller 228 may provide, via the network interface 234, signals corresponding to and/or containing information indicative of inputs received via the preferential travel input device 148. The vehicle controller 228 may also provide information indicative of one or more travel paths (e.g., the prioritized described herein) and/or one or more additional parameters included in a set of parameters via the preferential travel output device 150. Such information may be generated by the path calculator 214. Additionally or alternatively, such information may be received, by the network interface 234, from the remote vehicle control system 154 and via the network 152. In some examples, the vehicle controller 228 may additionally, or alternatively, control a suspension system of the vehicle 102. For example, in modifying operating parameters of the vehicle 102 based on a set of modified parameters received from the remote vehicle control system 154, the vehicle controller 228 may lower a suspension of the vehicle 102, increase a vehicle speed, stiffen a shock/strut response, and/or otherwise modify various vehicle component settings. As a result, the ride experience of a passenger may be altered. For example, controlling the vehicle 102 based on the received set of modified parameters may cause a passenger to experience enhanced accelerations in a lateral (e.g., sideways) direction, an axial direction (e.g., a direction substantially along the drive line 146), and/or a vertical direction (e.g., a direction substantially perpendicular to the road 106).

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 200 is merely illustrative and is not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 200 may be transmitted to the architecture 200 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations.

Figure 3:
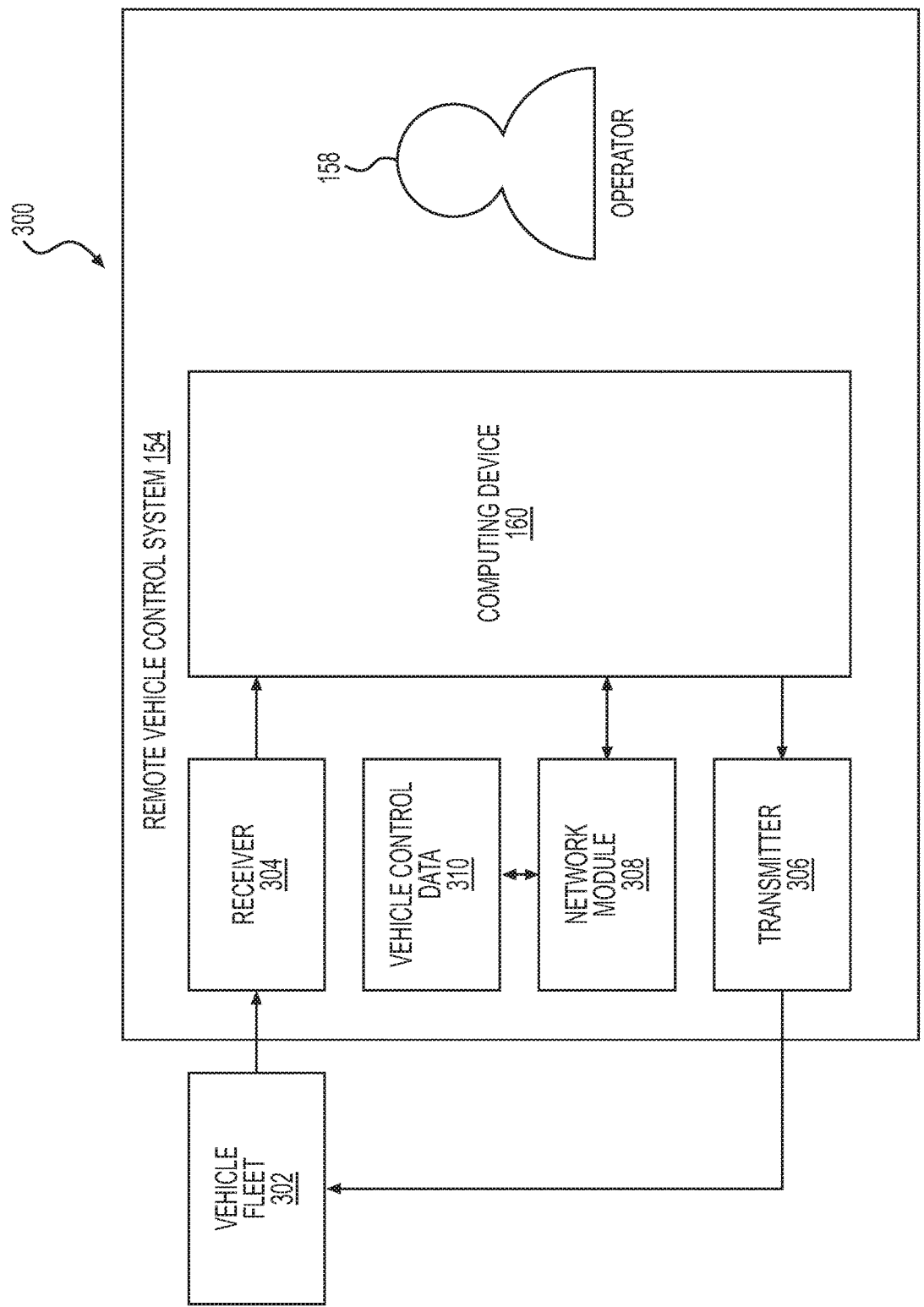
FIG. 3 is a block diagram illustrating an example vehicle control system architecture useful for interacting with vehicles remotely.

FIG. 3 shows an example architecture 300 including a vehicle fleet 302 and an example remote vehicle control system 154. The example vehicle fleet 302 includes a plurality of vehicles 102, at least some which are communicatively coupled to the remote vehicle control system 154, for example, via the respective network interfaces 234 of the vehicles 102, and a receiver 304 and a transmitter 306 associated with the remote vehicle control system 154. For example, a vehicle 102 may send communication signals via the network interface 234, which are received by the receiver 304. In some examples, the communication signals may include, for example, sensor data from sensor signals generated by one or more sensors associated with the vehicle 102, and/or road network data from a road network data store. In some examples, the sensor data may include raw sensor data or processed sensor data, and the road network data may include data related to a global or local map of an area associated with operation of the vehicle 102. In any of the examples described herein, such road network data may also include one or more of lane widths, speed limits, or a road map. Such lane widths, speed limits, and road maps may correspond to the one or more roads 106 of the road network 104 described herein. In some examples, the communication signals may include data associated with the current status of the vehicle 102 and its systems, such as, for example, its current position, current speed, current path, current occupancy, the level of charge of one or more of its batteries, and/or the operational status of its sensors and drive systems. In some examples, the communication signals from the vehicle 102 may include a request for information from the remote vehicle control system 154. Such information, may include, for example, assistance with operation of the vehicle 102 in the form of, for example, information about objects, the road network 104, the road 106, the global map, the local map, collaboration with respect to vehicle operations and maneuvers, and/or confirmation of information and/or actions proposed by the vehicle 102. In some examples, the communication signals from the vehicle 102 may include a request for preferential travel associated with the vehicle 102 and a particular destination 124 accessible via the road network 104. A passenger of the vehicle 102 may enter such a request via the preferential travel input device 148, and such a request may include at least an address, coordinates, and/or other information indicating the location of the destination 124.

As shown in FIG. 3, the receiver 304 may be communicatively coupled to the computing device 160, and in some examples, the operator 158 may be able access the sensor data, the road network data, and/or any other data in the communication signals received from a vehicle 102 using the computing device 160. In some examples, the operator 158 may be able to selectively access the sensor data, road network data, and/or other data via the input device 164 and view the selected data via one or more of the displays 162 (see FIG. 1). In some examples, such road network data may be stored in the object type data store 226 and/or in a road network data store operably connected to the vehicle controller 228. Such a road network data store may comprise a component of the vehicle system 202. In other examples, the road network data store may comprise a component of the remote vehicle control system 154 and may be operably connected to the computing device 160. In still further examples, a first portion of the road network data store may comprise a component of the remote vehicle control system 154, and a second portion of the road network data store may comprise a component of the vehicle system 202.

In the example shown, the remote vehicle control system 154 also includes a network module 308 configured to provide communication between two or more of the computing device 160 and the respective operators 158, and/or communication with vehicle control data 310. For example, the remote vehicle control system 154 may include a plurality of computing devices 160 and respective operators 158, and the operators 158 may communicate with one another via the network module 308 to facilitate and/or coordinate the various sets of parameters, path information, and/or other guidance provided to the vehicles 102 of the vehicle fleet 302. In some examples, there may be an operator 158 assigned to each of the vehicles 102, and in some examples, an operator 158 may be assigned to more than a single vehicle 102 of the vehicle fleet 302. In some examples, operators 158 may not be assigned to specific vehicles 102 of the vehicle fleet 302, but may instead provide sets of parameters, drive lines, trajectories, path information, and/or other guidance to vehicles 102 based on, for example, a level of urgency and/or a level of priority associated with the respective vehicles 102. In some examples, the various sets of parameters, path information, and/or other guidance provided to the vehicles 102 of the vehicle fleet 302 by an operator 158 may be stored by the remote vehicle control system 154, for example, in storage for the vehicle control data 310, and/or accessed by other operators 158. Further, it is understood that in some examples, the remote vehicle control system 154 may be fully automated. In such examples, the operators 158 described herein may be omitted. Additionally, in other examples, any of the methods and/or functions described herein may be performed by one or more of the local vehicle controllers 228. In such examples, the remote vehicle control system 154 may be omitted.

In some examples, the vehicle control data 310 may be accessible by the operators 158, for example, via the computing device 160, for use in generating one or more sets of modified parameters, drive lines, trajectories, drive envelopes, path information, and/or other guidance to the vehicles 102. For example, the vehicle control data 310 may include global and/or local map data related to the road network 104, events associated with the road network 104, and/or travel conditions associated with the road network 104 due to, for example, traffic volume, weather conditions, construction zones, and/or special events. In some examples, the vehicle control data 310 may include data associated with one or more of the vehicles 102 of the vehicle fleet 302, such as, for example, maintenance and service information, and/or operational history including, for example, event history associated with the vehicle 102, path histories, one or more sets of parameters governing operation of the vehicle 102, previously visited destinations 124, occupancy histories, and other types of data associated with the vehicle 102. In any of the examples described herein, and as noted above, one or more of the vehicles 102 may travel within a respective drive envelope 138 in accordance with a set of nominal operating parameters during normal operation. The one or more sets of modified operating parameters described herein may include, for example, an alteration (e.g., a relaxation or reduction) of at least one of the nominal operating parameters governing the current/normal operation of the vehicle 102. In another example, such a set of modified parameters may include at least one additional operating parameter not included in the nominal operating parameters. In a further example, such a set of modified parameters may omit one or more of the nominal operating parameters. In any such examples, upon receiving the set of modified parameters from the remote vehicle control system 154, the vehicle controller 228 may control operation of the vehicle 102 based at least in part on the set of modified operating parameters.

FIGS. 4a-7b illustrate example schematic overhead views of an example road network 104 including example vehicles 102a-102c (vehicles 102a-102f are shown in FIGS. 6a and 6b, and collectively, the vehicles shown in FIGS. 4a-7b may be referred to herein as "vehicles 102"). In FIGS. 4a-7b, the vehicles 102 are shown en route between respective first geographic locations and respective destinations at second geographic areas. For example, FIG. 4a illustrates a first vehicle 102a traveling, in the first direction 132, in the first lane 110a of the road 106 toward a particular destination 124. One or more of the additional vehicles 102b, 102c may also be traveling en route to the destination 124, or alternatively, one or more of the vehicles 102b, 102c may be traveling to a different respective destination (not shown). In such examples, one or more of the vehicles 102 may travel within respective drive envelopes 120 between respective first geographic locations and respective destinations 124. It is understood that such drive envelopes may each present unique driving circumstances for the respective vehicles 102. For example, such drive envelopes may cause the respective vehicles to pass through or proximate an accident zone, a lane closure, merging traffic, a school zone, a crosswalk, a police officer directing traffic, a construction zone, or other areas requiring modifications to the speed, and/or other operations of the vehicles 102. Additionally, in some situations, one or more of the vehicles 102 may receive an input from one or more passengers of the vehicle 102 indicative of a request for preferential travel. In any of the above situations, the methods, systems, and/or other aspects of the present disclosure may be used to determine one or more sets of modified parameters governing operation of the respective vehicles 102 once preferential travel has been requested. An example set of modified parameters may be different from the set of nominal operating parameters currently governing operation of the vehicle 102, and may cause and/or require a requesting vehicle 102 to travel along a prioritized path to the destination 124 without being slowed or otherwise hindered by the remaining vehicles 102 in the road network 104. In particular, example command signals including respective sets of modified parameters may be provided to the vehicles 102. Upon receiving such sets of modified parameters, the vehicle controllers 228 of the respective vehicles 102 may cause and/or require the vehicles 102 to travel within respective drive envelopes such that the requesting vehicle 102 is provided with a free lane (e.g., the first lane 110a) or other portion of the road network 104 in order to reach the destination 124 expeditiously. In such examples, the vehicle controller 228 of each of the respective vehicles 102 may consume respective sets of modified parameters and/or other information included in such command signals, and the path calculator 214 of each of the respective vehicles may determine one or more trajectories, a drive line including each of the one or more trajectories, drive envelope including the drive line, and/or other items based at least partly on such command signals and/or sets of parameters. In some examples, such commands to the vehicle controller 228 may additionally, or alternatively, comprise an increase in speed with an accompanying change in vehicle suspension to provide passengers with a racecar-like experience. In some examples, such a request may be made by a first responder (e.g. ambulance, fire truck, police, etc.) to create a free lane for optimizing travel time of the first responders.

FIG. 4a illustrates an example embodiment in which the vehicle 102a is traveling along the road 106, in the first direction 132, toward a particular destination 124. In such examples, a passenger of the vehicle 102a may provide an input via the preferential travel input device 148 of the vehicle 102a. For example, the passenger may provide such an input by actuating, pressing, moving, touching, and/or otherwise contacting the preferential travel input device 148. Additionally or alternatively, the passenger may provide an input by speaking, waiving, making one or more hand gestures, and/or through other non-contact methods. Any such inputs may be indicative of a request for preferential travel between a current location of the vehicle 102a and the destination 124. As noted above, such a request may comprise a request for a prioritized path in which none of the additional vehicles in the road network are disposed within or along a drive envelop and/or trajectory of the requesting vehicle 102 as the requesting vehicle 102 travels to the particular destination 124. In such examples, the vehicle 102a may be controlled to travel along a trajectory for a finite period of time or for a finite distance. For example, such a drive envelope and/or trajectory may comprise a drive segment, line, and/or route along which the requesting vehicle 102a may be controlled to travel for approximately 10 seconds. Alternatively, such a drive envelope and/or trajectory may comprise a drive segment, line, and/or route along which the requesting vehicle 102a may be controlled to travel for the next 500 feet. It is understood that the finite period of time and finite distance noted above are merely examples and, in further embodiments, such finite periods of time and finite distances may be greater than or less than those noted above. For instance, in examples in which the requesting vehicle 102a is traveling at a relatively high rate of speed, the finite period of time may be decreased and/or the finite distance may be commensurately increased to account for such speeds. Likewise, in examples in which the requesting vehicle 102a is traveling at a relatively low rate of speed, the finite period of time may be increased and/or the finite distance may be commensurately decreased. In such examples, it may be permissible for such additional vehicles 102b, 102c to be traveling in one or more lanes 110 (e.g., the first lane 110a) adjacent to the second lane 110b in which the requesting vehicle 102a is traveling, as such locations would be outside of the trajectory of the requesting vehicle 102a.

The vehicle controller 228 in communication with the preferential travel input device 148 may generate a signal indicative of the request for preferential travel, and the vehicle controller 228 may provide the signal to the remote vehicle control system 154, via the network 152. The remote vehicle control system 154 may determine respective sets of modified parameters for the one or more vehicles 102 in the road network 104 based at least partly on the request. In some examples, the sets of modified parameters may include respective drive envelopes, trajectories, drive lines, drive envelopes and/or parameters governing travel of the respective vehicles 102 in the road network 104. Alternatively, the sets of parameters may provide information and or instructions which, when consumed by a vehicle controller 228 may cause the path calculator 214 to generate and/or otherwise determine one or more trajectories, a drive line, a drive envelope, and/or other parameters governing travel of the corresponding vehicle. The remote vehicle control system 154 may also provide corresponding command signals to the respective vehicles 102, and the command signals may each include one or more of the respective sets of parameters described herein. In some examples, a set of parameters included in a command signal received by the requesting vehicle 102a may cause the vehicle 102a to move from the first lane 110a to the second lane 110b in the direction of arrow 400. In such examples, as will be described below, one or more drive envelopes defining a prioritized path to the destination 124 may be at least partly defined by and/or may pass substantially along the second lane 110b. Additionally, the set of parameters included in the command signal received by the requesting vehicle 102a may cause the vehicle 102a to accelerate and/or decelerate in order to move in the direction of arrow 400 and/or to travel along such drive line. Such sets of parameters may also cause modification of a suspension setting, speed threshold, engine setting, turbo setting, brake setting, and/or other operating parameter of a respective vehicle 102. As a non-limiting example, the suspension may be lowered during the initial acceleration into the prioritized trajectory and/or along the drive line defined by arrow 400 such that the passenger requesting the prioritization experiences modified vehicle settings that correspond to the prioritization request and/or to preference of the passenger.

FIG. 4b illustrates the example of FIG. 4a after the vehicles 102a, 102b, 102c have been caused to operate in accordance with the command signals described above. For example, upon receiving a first command signal from the remote vehicle control system 154 including a first set of parameters, the first vehicle 102a may be caused to travel along a prioritized path 402 (e.g., a first path 402 extending from the vehicle 102a to the destination 124). The first path 402 may comprise the drive line 146 and/or a first drive envelope 138 that includes the drive line 146, i.e. an ideal line for the vehicle 102 to follow. For example, the first path 402 may comprise a series of consecutive prioritized trajectories, and together, such trajectories may define the drive line 146 within the drive envelope 138. In such examples, the vehicle 102a may travel along the drive line 146, and the drive line 146 may extend approximately centrally through the drive envelope 138 and/or the first path 402. Additionally, upon receiving respective second and third command signals from the remote vehicle control system 154 including respective second and third sets of parameters, the second vehicle 102b and the third vehicle 102b may be caused to travel along respective drive lines maintaining the vehicles 102b, 102c outside of the drive envelopes and/or one or more trajectories defining the drive line 146 of the requesting vehicle 102a as the requesting vehicle 102a travels to the particular destination 124 along the prioritized path 402. In particular, upon receiving a second command signal from the remote vehicle control system 154, the second vehicle 102b may be caused to travel within a second drive envelope 406 defined by and/or including a corresponding third drive line (not shown), and upon receiving a third command signal from the remote vehicle control system 154, the third vehicle 102c may be caused to travel within a third drive envelope 408 defined by and/or including a corresponding third drive line (not shown). Based on the sets of modified parameters included in such second and third control signals, the respective vehicle controllers 228 of the second and third vehicles 102b, 102c may maintain the second and third vehicles 102b, 102c outside of the drive envelope(s) and/or one or more trajectories defining the drive line 146 of the requesting vehicle 102a as the requesting vehicle 102a travels to the particular destination 124 along the prioritized path 402. The sets of parameters included in the command signals received by the second and third vehicles 102b, 102c may also cause at least one of the second and third vehicles 102b, 102c to accelerate and/or decelerate in order to travel within the second and third drive envelopes 406, 408, respectively.

Additionally, in such examples the first set of parameters may be at least partly less restrictive than the second and third sets of parameters, thereby providing the first vehicle 102a with expanded road network usage privileges relative to the remaining vehicles 102 in the road network 104. For instance, in any of the examples described herein, the sets of parameters may include a speed threshold below which a respective one of the vehicles 102 may be permitted and, in some situations, required to operate, a drive line 146 along which the one of the vehicles 102 may be permitted and, in some situations, required to travel, a drive envelope 138 and/or path along which or within which the one of the vehicles 102 may be permitted and, in some situations, required to travel, traffic rules (e.g., rules governing vehicle operation with regard to stop signs, traffic lights, no passing zones, school zones, or other areas) with which the one of the vehicles 102 must abide, engine, turbo, brake, suspension, and/or other vehicle component settings, and/or other rules or limitations for operating the one of the vehicles 102. In such examples, the thresholds, drive envelopes, traffic rules, vehicle component settings, and/or other rules or limitations included in the first set of parameters may be at least partly less restrictive than the corresponding rules or limitations included in the additional sets of parameters determined by the remote vehicle control system 154.

Although FIGS. 4a and 4b illustrate an example embodiment in which the requesting vehicle 102a may be caused to move from a first lane 110a to a second lane 110b, in other examples various command signals provided by the remote vehicle control system 154 may include respective sets of modified parameters that cause vehicles 102 other than the requesting vehicle 102a to change lanes. For example, FIGS. 5a and 5b illustrate an example embodiment in which the requesting vehicle 102a may be controlled to remain in the first lane 110a (e.g., the lane in which the requesting vehicle 102a is currently traveling) and in which one or more of the additional vehicles 102 traveling along the road 106 may be caused to move from the lane in which the requesting vehicle 102a is currently traveling (e.g., the first lane 110a) to the second lane 110b and/or any other lane different from the lane in which the requesting vehicle 102a is currently traveling. In such examples, and as illustrated in FIG. 5a, the vehicle 102a may be traveling in the first direction 132 toward a particular destination 124. During such travel, a passenger of the vehicle 102a may provide an input via the preferential travel input device 148 of the vehicle 102a, and the input may be indicative of a request for prioritized travel between a current location of the vehicle 102a and the destination 124.

The vehicle controller 228 in communication with the preferential travel input device 148 of the requesting vehicle 102a may generate a signal indicative of the request for preferential travel, and the vehicle controller 228 may provide the signal to the remote vehicle control system 154, via the network 152. The remote vehicle control system 154 may determine respective sets of modified parameters for the one or more vehicles 102 in the road network 104 based at least partly on the request. In some examples, the sets of modified parameters may include respective trajectories, drive lines, drive envelopes, and/or other parameters governing travel of the respective vehicles 102 in the road network 104. Alternatively, the sets of parameters may provide information and/or instructions which, when consumed by a vehicle controller 228 may cause the path calculator 214 to generate and/or otherwise determine one or more trajectories, a drive line, a drive envelope, and/or other parameters governing travel of the corresponding vehicle. Such respective sets of parameters may also include any of the additional settings, thresholds, rules, limitations, or other parameters described herein. The remote vehicle control system 154 may also provide corresponding command signals to the respective vehicles 102, and the command signals may each include one or more of the respective sets of parameters described herein.

In the embodiment illustrated by FIG. 5a, a command signal received by the requesting vehicle 102a and including a first set of parameters may cause the vehicle 102a to remain in its current lane (i.e., first lane 110a). In such examples, a prioritized path extending from the requesting vehicle 102a to the destination 124 may be at least partly defined by and/or may pass substantially along the first lane 110a. Additionally, the command signals received by the remaining vehicles 102b, 102c in the road network 104 and including respective second and third sets of parameters, may cause one or more of the vehicles 102b, 102c to move in the direction of arrow 500 from the first lane 110a to the second lane 110b and/or any other lane different from the first lane 110a. In any such examples, one or more sets of parameters included in the command signals may cause a respective vehicle 102 to accelerate and/or decelerate in order to change from the first lane 110a to the second lane 110b, and/or to travel along a respective trajectory. Such sets of parameters may also cause modification of a suspension setting, speed threshold, engine setting, turbo setting, brake setting, and/or other operating parameter of a respective vehicle 102, as described herein.

FIG. 5b illustrates the embodiment of FIG. 5a after the vehicles 102a, 102b, 102c have been caused to operate in accordance with the command signals described above. For example, upon receiving a first command signal from the remote vehicle control system 154 including a first set of parameters, the first vehicle 102a may be caused to travel along a prioritized path 502 (e.g., a first path 502 extending from the vehicle 102a to the destination 124). The first path 502 may comprise the drive line 146 and/or a first drive envelope 138 that includes and/or is defined by the drive line 146. In such examples, the vehicle 102a may travel along the drive line 146, and the drive line 146 may extend approximately centrally through the drive envelope 138 and/or the first path 502. As illustrated in FIG. 5b, the first drive envelope 138 and the respective drive line 146 may be substantially longer than those of vehicles 102b, 102c (i.e. 506 and 508) despite corresponding to a substantially similar receding horizon (e.g. 10 seconds). In such an example, the longer drive envelope 138/drive line 146 of vehicle 102a may be indicative of a greater rate of travel (i.e. speed) than either vehicle 102b, 102 c. In the example shown in FIG. 5b, the command signal received from the remote vehicle control system 154 may cause the vehicle 102a to remain in the first lane 110a as the vehicle 102a travels along at least part of the first path 502.

Additionally, upon receiving respective second and third command signals from the remote vehicle control system 154 including respective second and third sets of parameters, the second vehicle 102b and the third vehicle 102b may be caused to travel along respective drive lines maintaining the vehicles 102b, 102c outside of the one or more drive envelopes and/or trajectories defining the drive line 146 of the requesting vehicle 102a as the requesting vehicle 102a travels to the destination 124 along the prioritized path 502. In particular, upon receiving a second command signal from the remote vehicle control system 154, the second vehicle 102b may be caused to travel within a second drive envelope 506 defined by and/or including a corresponding second drive line (not show), and upon receiving a third command signal from the remote vehicle control system 154, the third vehicle 102c may be caused to travel within a third drive envelope 508 defined by and/or including a corresponding third drive line (not show). Based on the sets of modified parameters included in such second and third control signals, the respective vehicle controllers 228 of the second and third vehicles 102b, 102c may maintain the second and third vehicles 102b, 102c outside of the one or more drive envelopes and/or trajectories defining the drive line 146 of the requesting vehicle 102a as the requesting vehicle 102a travels to the destination 124 along the prioritized path 502. The sets of parameters included in the respective command signals received by the second and third vehicles 102b, 102c may cause at least one of the second and third vehicles 102b, 102c to accelerate and/or decelerate in order to travel within the second and third drive envelopes 506, 508, respectively. For example, the set of parameters included in the command signal received by the second vehicle 102b may cause the vehicle 102b to accelerate in order to move in the direction of arrow 500 and/or to change from the first lane 110a to the second lane 110b.

Additionally or alternatively, the set of parameters included in the command signal received by the third vehicle 102c may cause the third vehicle 102c to decelerate in order to permit the second vehicle 102b to pass in front of the third vehicle 102c. Additionally, in such examples the first set of parameters may be at least partly less restrictive than the second and third sets of parameters, thereby providing the first vehicle 102a with expanded road network usage privileges relative to the remaining vehicles 102 in the road network 104.

In any of the examples described herein, the sets of parameters determined and/or provided by the remote vehicle control system 154 at least partly in response to a request for preferential travel may be determined such that a minimum number of vehicles 102 are caused to change lanes 110 when preferential travel is provided to the requesting vehicle 102a. Such determinations may be made based on the relative speeds, destinations, applicable traffic rules, and/or locations of the plurality of vehicles 102 in the road network 104 when the request for preferential travel is received by the remote vehicle control system 154. For example, relatively congested traffic patterns proximate the requesting vehicle 102a may cause the remote vehicle control system 154 to determine one or more sets of modified parameters that result in the requesting vehicle 102a and at least one of the remaining vehicles 102 in the road network 104 to change lanes. FIGS. 6a and 6b illustrate such an example in the context of a road 106 having three lanes 110 (e.g., a first lane 110a, a second lane 110b, and a third lane 110c) separated by respective dividing lines 114a, 114b.

As shown in FIG. 6a, a first vehicle 102a may be traveling in the first direction 132 toward a particular destination 124. During such travel, a passenger of the vehicle 102a may provide an input via the preferential travel input device 148 of the vehicle 102a, and the input may be indicative of a request for preferential travel from a current location of the vehicle 102a to the destination 124. The vehicle controller 228 in communication with the preferential travel input device 148 of the requesting vehicle 102a may generate a signal indicative of the request for preferential travel, and the vehicle controller 228 may provide the signal to the remote vehicle control system 154, via the network 152. The remote vehicle control system 154 may determine respective sets of modified parameters for the one or more vehicles 102 in the road network 104 based at least partly on the request. The remote vehicle control system 154 may also provide corresponding command signals to the respective vehicles 102, and the command signals may each include respective sets of modified parameters as described herein.

In the embodiment illustrated by FIG. 6a, a first set of modified parameters included in a command signal received by the requesting vehicle 102a may cause the vehicle 102a to move, in the direction of arrow 600, from its current lane (e.g., the third lane 110c) to an adjacent lane (e.g., the second lane 110b). Such movement may be the result of relatively congested traffic ahead of the vehicle 102a in the third lane 110c and/or by relatively less congested traffic ahead of the vehicle 102a in the second lane 110b and/or any other adjacent lane. For example, the presence of vehicles 102f, 102e ahead of the vehicle 102a in the third lane 110c, as well as the positions of the vehicles 102f, 102e relative to the vehicle 102b, and the position of vehicle 102b relative to vehicles 102c, 102d, may cause the remote vehicle control system 154 to generate a first set of modified parameters. When such a first set of parameters is consumed by the vehicle controller 228 of the requesting vehicle 102a, the first set of parameters may cause the path calculator 214 to generate a prioritized path, extending from the requesting vehicle 102a to the destination 124, and resulting in the requesting vehicle 102a moving from the third lane 110c to the second lane 110b. The remote vehicle control system 154 may also determine additional sets of parameters for one or more of the vehicles 102 based at least in part on the travel speeds of the vehicles 102 when the request from the vehicle 102a is received. For example, since the requesting vehicle 102a is positioned behind vehicles 102f, 102e, movement of the vehicle 102a in the direction of arrow 600, combined with movement of the vehicle 102b in the direction or arrow 602, may result in the most expedient development of a lane (e.g., the second lane 110b) in which the requesting vehicle 102a may have a relatively clear path to the destination 124, particularly in situations in which for example, the nominal operating parameters of at least one of the vehicles 102e, 102f cannot be modified. For example, since the vehicle 102b is currently the only vehicle in the second lane 110b, and the vehicle 102b is relatively behind vehicle 102e but relatively ahead of vehicle 102c in the direction 132, the remote vehicle control system 154 and/or the path calculator 214 of at least the requesting vehicle 102a may determine that movement of the vehicle 102a in the direction of arrow 600, combined with movement of the vehicle 102b in the direction or arrow 602, may be the most efficient manner in which to provide a prioritized path for the vehicle 102a to the destination 124. In such examples, maximizing efficiency may result in the fewest number of vehicles 102 changing lanes 110, and may depend on, for example, the nominal operating parameters of the various vehicles 102 and whether such parameters may be modified. Additionally or alternatively, maximizing efficiency may result in the fastest travel path for the requesting vehicle 102a to the destination 124 (e.g., a prioritized path in which the fewest number of vehicles 102 are required to decelerate, the path in which the speed of the requesting vehicle 102a may be maximized, and/or the path in which the travel time for the requesting vehicle 102a from its current location to the destination 124 may be minimized). In any such examples, a set of parameters included in one or more of the command signals may cause a respective one of the vehicles 102 to accelerate and/or decelerate in order to move between lanes 110 and/or to travel along respective drive lines.

FIG. 6b illustrates the embodiment of FIG. 6a after the vehicles 102a-102f have been caused to operate in accordance with the command signals described above. For example, upon receiving a first command signal from the remote vehicle control system 154 including a first set of parameters, the first vehicle 102a may be caused to travel along a prioritized path 604 (e.g., a first path 604 extending from the vehicle 102a to the destination 124). The first path 604 may comprise the drive line 146 and/or a first drive envelope 138 that includes the drive line 146. For example, the first path 604 may comprise a series of consecutive prioritized trajectories, and together, such trajectories may define the drive line 146 within the drive envelope 138. In such examples, the requesting vehicle 102a may travel along the drive line 146, and the drive line 146 may extend approximately centrally through the drive envelope 138 and/or the first path 604. In the example shown in FIG. 6b, the set of parameters included in the command signal received from the remote vehicle control system 154 may cause the vehicle 102a to move from the third lane 110c to the second lane 110b. In such examples, additional sets of parameters included in respective command signals received by the remaining vehicles 102 in the road network 104 may cause the remaining vehicles 102 to travel along respective drive lines maintaining the remaining vehicles 102 outside of the one or more drive envelopes and/or trajectories defining the drive line 146 as the requesting vehicle 102a travels to the particular destination 124 along the prioritized path 604.

For example, upon receiving a command signal from the remote vehicle control system 154 including a second set of parameters, the second vehicle 102b may be caused to travel within a second drive envelope 608 defined by and/or including a corresponding second drive line (not shown). In the example shown in FIG. 6b, the second set of parameters included in the command signal received from the remote vehicle control system 154 may cause the vehicle 102b to move from the second lane 110b to the first lane 110a. Further, additional sets of parameters included in respective command signals from the remote vehicle control system 154 may cause the remaining vehicles 102 to travel within respective drive envelopes maintaining the remaining vehicles 102 outside of the one or more drive envelopes and/or trajectories defining the drive line 146 as the requesting vehicle 102a travels to the particular destination 124 along the prioritized path 604. In particular, upon receiving a third command signal from the remote vehicle control system 154 including a third set of parameters, the third vehicle 102c may be caused to travel within a third drive envelope 610 defined by and/or including a corresponding third drive line (not shown). The sets of parameters included in respective command signals received by the additional vehicles 102 in the road network 104 may also be consumed by the vehicle controllers 228 of such vehicles 102, and may maintain such remaining vehicles 102 outside of the one or more trajectories defining the drive line 146 as the requesting vehicle 102a travels to the particular destination 124 along the prioritized path 604. The sets of parameters included in the respective command signals received by the remaining vehicles 102 may also cause at least one of the remaining vehicles 102 to accelerate and/or decelerate in order to travel within the respective drive envelopes described herein. For example, the set of parameters included in the command signal received by the second vehicle 102b may cause the second vehicle 102b to accelerate in order to move in the direction of arrow 602 and/or to change from the second lane 110b to the first lane 110a. Additionally or alternatively, the set of parameters included in the command signal received by the third vehicle 102c may cause the third vehicle 102c to decelerate in order to permit the second vehicle 102b to pass in front of the third vehicle 102c. In such examples, the first set of parameters may be at least partially less restrictive than the second and third sets of parameters, thereby providing expanded road network usage privileges to the requesting vehicle 102a.

Although FIGS. 4a-6b illustrate example embodiments in which typical traffic rules (e.g., rules governing vehicle operation with regard to stop signs, traffic lights, no passing zones, school zones, construction zones, lane designations, speed limits, etc.) are substantially obeyed by the vehicles 102 in the road network 104 once a request for preferential travel is received. In additional embodiments, on the other hand, providing a requesting vehicle 102a with preferential travel may include permitting the requesting vehicle 102a to at least temporarily break one or more traffic rules in order to travel along a prioritized path to the particular destination 124. For example, FIGS. 7a and 7b illustrate an embodiment in which the requesting vehicle 102a may be controlled to travel along a prioritized path that is at least partly defined by a drive envelope having an enlarged drive envelope width relative to drive envelope widths corresponding to the remaining vehicles 102 in the road network. In such examples, the drive envelope of the requesting vehicle 102a may also straddle at least two lanes 110a, 110b of the road 106. Further, in traveling to the destination 124, the requesting vehicle 102a may be permitted to exceed an applicable speed limit associated with the road 106, may be permitted to ignore double yellow lines, may be permitted to travel abnormally close to an adjacent vehicle (e.g., travel at a distance of one foot or less from an adjacent vehicle), and/or may be configured to modify (e.g., enhance) vision, perception, or other systems of the vehicle 102.

As illustrated in FIG. 7a, the first vehicle 102a may be traveling in the first direction 132 toward a particular destination 124. The first vehicle 102a may be traveling, for example, along a first path 702 extending from the first vehicle 102a to the destination. In such examples, the first path 702 may be at least partly defined by a first drive envelope 138a having a first drive envelope width 142a. Additionally, the road network 104 may include a second vehicle 102b traveling along a second path 704 that is at least partly defined by a second drive envelope 138b having a second drive envelope width 142b. The road network 104 may further include a third vehicle 102c traveling along a third path 706 that is at least partly defined by a third drive envelope 138c having a third drive envelope width 142c. In the example embodiment of FIG. 7a, the first, second, and third drive envelope widths 142a, 142b, 142c may be substantially equal. Additionally, at least one of the first, second, and third drive envelope widths 142a, 142b, 142c may be less than or equal to a width of a corresponding lane 110a, 110b within which the respective drive envelope 138a, 138b, 138c is disposed. In such examples, the first drive envelope 138a, the second drive envelope 138b, and the third drive envelope 138c may each be disposed within either the first lane 110a or the second lane 110b.

In such examples, a passenger of the first vehicle 102a may provide an input via the preferential travel input device 148 of the first vehicle 102a, and the input may be indicative of a request for preferential travel between a current location of the first vehicle 102a and the destination 124. The vehicle controller 228 in communication with the preferential travel input device 148 of the first vehicle 102a may generate a signal indicative of the request for preferential travel, and the vehicle controller 228 may provide the signal to the remote vehicle control system 154 via the network 152. The remote vehicle control system 154 may determine respective sets of modified parameters for the one or more vehicles 102 in the road network 104 based at least partly on the request. The remote vehicle control system 154 may also provide corresponding command signals to the respective vehicles 102, and the command signals may each include one or more of the respective sets of modified parameters described herein.

In the embodiment illustrated by FIG. 7b, a command signal received by the requesting vehicle 102a and including a first set of modified parameters may cause the requesting vehicle 102a to travel along a prioritized path 708 extending from the vehicle 102a to the destination 124. In such examples, the prioritized path 708 may include a respective drive line comprising one or more consecutive prioritized trajectories (not shown), and may be defined, at least in part, by a fourth drive envelope 138d having a fourth drive envelope width 142d greater than the first drive envelope width 142a. As shown in FIG. 7b, the fourth drive envelope 138d and/or the prioritized path 708 may span at least part of both the first lane 110a and the second lane 110b. The requesting vehicle 102a may be permitted to travel within such a widened prioritized path 708 and/or fourth drive envelope 138*d* despite applicable traffic rules requiring vehicles 102 to travel in a single lane 110*a*, 110*b* unless passing another vehicle 102.

In such examples, the command signal received by the requesting vehicle 102*a* and including such a first set of parameters may also cause the requesting vehicle 102*a* to travel at a speed less than or equal to an increased speed threshold. In such examples, the increased speed threshold may be included in the command signal and may, in some instances, be greater than the speed limit associated with the road 106. In such examples, the command signal received by the requesting vehicle 102*a* and including such a first set of parameters may further include a modified suspension setting, engine setting, brake pressure setting, turbo setting, and/or other operational parameter. Such modified settings may cause the requesting vehicle 102*a* to operate based at least in part on settings and/or operating preferences corresponding to the request and/or corresponding to the personal preferences of one or more passengers of the requesting vehicle 102*a*.

Additionally, the command signals received by the remaining vehicles 102*b*, 102*c* in the road network 104 and including respective second and third sets of parameters, may cause one or more of the vehicles 102*b*, 102*c* to move closer to the lane boundary lines 116*a*, 116*b* and/or shoulders corresponding to the lanes 110*a*, 110*b* within which the vehicles 102*b*, 102*c* are traveling. The command signals received by the remaining vehicles 102*b*, 102*c* in the road network 104 and including respective second and third sets of parameters, may also cause one or more of the vehicles 102*b*, 102*c* to travel within respective drive envelopes having reduced width. For example, a second set of parameters included in the command signal received by the second vehicle 102*b* may cause the second vehicle 102*b* to travel in a fifth path 710 that is defined, at least in part, by a fifth drive envelope 138*e* having a fifth drive envelope width 142*e* less than the second drive envelope width 142*b*. Additionally, a third set of parameters included in the command signal received by the third vehicle 102*c* may cause the third vehicle 102*c* to travel in a sixth path 712 that is defined, at least in part, by a sixth drive envelope 138*f* having a sixth drive envelope width 142*f* less than the third drive envelope width 142*c*. As shown in FIG. 7*b*, the fifth and sixth drive envelopes 138*e*, 138*f* may span only a portion of the respective lane 110*a*, 110*b* within which the second and third vehicles 102*b*, 102*c* are traveling. Further, the fifth and sixth drive envelope widths 142*e*, 142*f* may be less than the fourth drive envelope width 142*d*. In this way, the requesting vehicle 102*a* may be granted enhanced road network usage privileges at least partly in response to a request for preferential travel.

In some examples, the vehicles 102 illustrated in FIGS. 4*a*-7*b* may be driverless non-emergency passenger vehicles. In other examples, on the other hand, at least the requesting vehicle 102*a* illustrated in FIGS. 4*a*-7*b* may comprise emergency response vehicles (e.g., ambulances, fire trucks, police cars, military vehicles, etc.), whether driverless or not. In any such example described herein, additional command signals may be sent to one or more traffic lights or other traffic control devices along the prioritized path. For example, such additional command signals may change all traffic lights to "green" along the prioritized path such that the requesting vehicle 102*a* may not have to stop at "red" traffic lights in emergency situations. Such situations may include, for example, situations in which a health emergency (e.g., a stroke, a heart attack, etc.) occurs within the requesting vehicle 102*a*. In still further examples, any of the systems or methods described herein may also be employed by standard (e.g., non-driverless) vehicles. For example, a standard ambulance, fire truck, police car, or other non-driverless emergency vehicle, or a control system associated therewith, may provide a signal to one or more of the vehicles 102 that an emergency situation has occurred. In response, one or more of the vehicles 102 may be controlled to clear a path (e.g., a prioritized path) for one or more non-driverless emergency vehicles. In any of the examples described herein, one or more of the vehicles 102 may mimic an ambulance, fire truck, police car, or other emergency response vehicle in one or more ways. For example, upon receiving a command signal from the remote vehicle control system 154, the vehicle controller 228 of the requesting vehicle 102 may cause one or more lights, sirens, horns, and/or other output components of the vehicle 102 to activate. In such examples, one or more lights, light bars, or other visual output devices of the vehicle 102 may be caused to flash as the vehicle 102 is controlled to traverse a prioritized path in the road network 104. Additionally or alternatively, in such examples, one or more horns, sirens, speakers, or other audio output devices of the vehicle 102 may be caused to emit an audible tone as the vehicle 102 is controlled to traverse a prioritized path. In this way, such output may cause and/or enable other vehicles 102 in the road network 104 to move from or exit the drive envelope of the requesting vehicle 102 emitting such output without the other vehicles receiving a command signal causing such movement.

As noted above, in any of the examples described herein the sets of parameters included in the various command signals provided by the remote vehicle control system 154 may include instructions that cause the vehicle controllers 228 of the respective vehicles 102 to modify one or more performance parameters of the respective vehicles 102 (e.g., speed, acceleration, suspension settings, brake pressure settings, braking rates, engine settings, turbo settings, steering input rates, etc.) and/or operation parameters of the respective vehicles 102 (e.g., safety-related guidelines for controlling the vehicle). Additionally, although not specifically illustrated in FIGS. 4*a*-7*b*, one or more conditions or events associated with the road network 104 may modify the travel paths, trajectories, drive lines, drive envelopes, and/or other parameters described herein. Such conditions or events may include accidents, school, and construction zones, flood zones, parade zones, special event zones, and/or zones associated with slow traffic, such as areas where vehicles are being driven into bright sunlight or areas where weather conditions such as rain or snow are affecting traffic rates.

Figure 8:
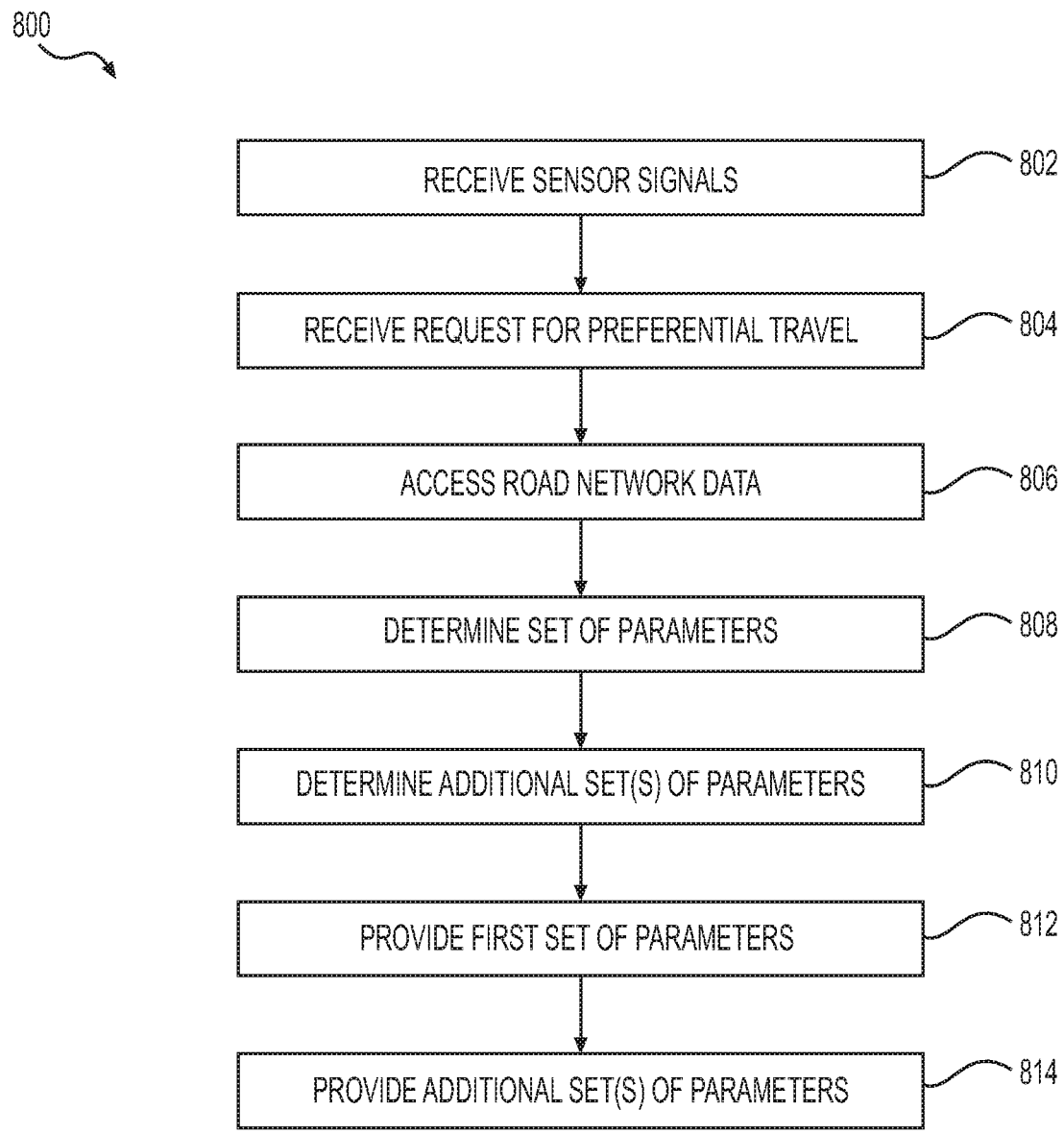
FIG. 8 is a flow diagram of an example method for operating one or more vehicles traveling in an example road network. Such an example method may include determining and providing one or more sets of parameters governing operation of one or more vehicles while the vehicles travel to respective destinations.

FIG. 8 is a flow diagram of an example process illustrated as a collection of blocks in a logical flow graph. The various blocks shown in FIG. 8 represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

In particular, FIG. 8 is a flow diagram of an example method 800 for operating one or more vehicles (e.g., one or more driverless vehicles). At 802, the example method 800 may include receiving, at the computing device 160 and/or other components of the remote vehicle control system 154, sensor signals including sensor data 206 from one or more sensors 204 associated with a plurality of vehicles 102 (e.g., a plurality of driverless vehicles). In some examples, the sensor data 206 may be related to operation of the respective vehicles 102 to which the sensors 204 are connected. For example, the sensor data 206 may include sensor signals associated with the environment 100 through which the vehicles 102 are traveling. In some examples, the sensor data 206 may include sensor signals indicative of a respective location, speed, and/or other operational parameter of each vehicle 102 traversing the road network 104. It is understood that each vehicle 102 may have one or more sensors 204 connected thereto, and in such examples, the sensor signals received at 802 may comprise respective signals generated by the sensors 204 connected to the various individual vehicles 102 in the road network 104. Further, each vehicle 102 of the plurality of vehicles may have a number, alpha-numeric code, and/or other identifier assigned thereto and uniquely identifying the vehicle 102. In such examples, the sensor signals received at 802 may also include the unique identifier corresponding to the vehicle 102 to which the one or more sensors 204 generating the signal is/are connected.

At 804, the example method 800 may include receiving, at the computing device 160 and/or other components of the remote vehicle control system 154, a request from one or more of the vehicles 102, and such a request may comprise a request for preferential travel from a current location of the requesting vehicle 102 to a particular destination 124. For example, while traversing the road 106, a passenger of a first vehicle 102a may provide an input via the preferential travel input device 148 of the vehicle 102a. For example, the passenger may provide such an input by actuating, pressing, moving, touching, and/or otherwise contacting the preferential travel input device 148. Additionally or alternatively, the passenger may provide an input by speaking, waiving, making one or more hand gestures, and/or through other non-contact methods. Any such inputs may be indicative of a request for preferential travel within the road network 104 between the current location of the requesting vehicle 102a and the destination 124, and the request may be generated by the preferential travel input device 148, the vehicle controller 228, and/or one or more other components of the vehicle system 202 at least partly in response to the input received from the passenger. Additionally, in some examples the request may include the unique identifier corresponding to the vehicle 102a from which the request is received (e.g., the requesting vehicle 102a).

At 806, the example method 800 may include accessing, with the computing device 160 and/or other components of the remote vehicle control system 154, road network data stored in, for example, a road network data store. The road network data may be based at least in part on a location of the vehicle 102a. In some examples, this may include global and/or local map data that may be stored and/or updated by the vehicle 102a and/or by the remote control center 156. Such road network data may include, among other things, data related to a global or local map of at least a portion of the road network 104 at which the vehicle 102a is located. The road network data may include, for example, one or more maps illustrating the various roads 106 that may be available for the vehicle 102a to reach the destination 124 from the current location of the requesting vehicle 102a.

At 808, the example method 800 may include determining, at the computing device 160 and/or other components of the remote vehicle control system 154, a set of modified parameters for operating the requesting vehicle 102a as the requesting vehicle 102a travels within the road network 104 to the destination 124. For example, under normal operating conditions (e.g., non-preferential travel conditions), each of the vehicles 102 may be controlled by the respective vehicle controllers 228 to operate according to nominal operating parameters governing movement of the respective vehicles 102 within the road network 104. In some embodiments, the requesting vehicle 102a may be permitted and, in some situations, required to operate, within the road network 104, in accordance with a first set of nominal operating parameters, while a second vehicle 102b may be permitted and, in some situations, required to operate, within the road network 104, in accordance with a second set of nominal operating parameters. In some examples (e.g., in normal operating conditions), the first set of nominal operating parameters may be the same as the second set of nominal operating parameters, while in other examples the first set of nominal operating parameters may be different from the second set of nominal operating parameters. In any of the embodiments described herein, such sets of nominal operating parameters may include a speed threshold below which a respective one of the vehicles 102 may be permitted and, in some situations, required to operate, a drive line 146 along which the one of the vehicles 102 may be permitted and, in some situations, required to travel, a drive envelope 138 along which or within which the one of the vehicles 102 may be permitted and, in some situations, required to travel, traffic rules with which the one of the vehicles 102 must abide, and/or other rules or limitations for operating the one of the vehicles 102. In some examples, the first and second sets of nominal operating parameters may be generated and/or otherwise determined by the remote vehicle system 154, and may be provided to the respective vehicles 102a, 102b for operation thereof within the road network 104.

Accordingly, in examples in which the first vehicle 102a is operating in accordance with the first set of nominal operating parameters described above and in which the second vehicle 102b is operating in accordance with the second set of nominal operating parameters, at 808 the remote vehicle control system 154 may determine a third set of parameters (e.g., a set of one or more modified parameters) for operating the first vehicle 102a. The remote vehicle control system 154 may determine such a third set of parameters based at least partly on the request received at 804 and on the sensor data included in the sensor signals received at 802. Additionally, the third set of parameters determined at 808 may be at least partly less restrictive than the first set of nominal operating parameters governing normal operation of the first vehicle 102a. For example, where the first set of nominal operating parameters may define and/or otherwise include a first speed threshold below which the first vehicle 102a is permitted and/or required to operate, the third set of modified parameters determined at 808 may include a second speed threshold greater than the first speed threshold, thereby enabling the first vehicle 102a to travel at a higher speed. As another example, where the first set of nominal operating parameters may define and/or otherwise include a first strut setting, suspension setting, brake pressure setting, turbo setting, engine tuning configuration, and/or other vehicle parameter associated with normal and/or non-preferential travel, the third set of modified parameters may define and/or otherwise include a second strut setting, suspension setting, brake pressure setting, turbo setting, engine tuning configuration, and/or other vehicle parameter setting causing the first vehicle 102a to operate in a modified drive mode (e.g., a preferential travel mode, an emergency mode, etc.). In such a modified drive mode, the first vehicle 102a may be caused to operate in accordance with preferences or other settings of one or more passengers riding in the first vehicle 102a. For example, the first suspension setting of the first set of nominal operating parameters may cause a strut or other suspension component of the first vehicle 102a to operate with a first level of sensitivity, and the second suspension setting of the third set of modified parameters may cause such a suspension component of the first vehicle 102a to operate with a second level of sensitivity greater than the first level of sensitivity.

As a further example, and as illustrated in at least FIGS. 7a and 7b, where the first set of nominal operating parameters may be consumed by the path calculator 214 of the first vehicle 102a to define and/or otherwise determine a first drive envelope 138a (having a first drive envelope width 142a) along which or within which the first vehicle 102a is permitted and/or required to travel, the third set of modified parameters determined at 808 may be consumed by the path calculator 214 of the first vehicle 102a to define and/or otherwise determine a fourth drive envelope 138d (having a fourth drive envelope width 142d) and/or a prioritized path 708 along which or within which the first vehicle 102a is permitted and/or required to travel. In such examples, the fourth drive envelope width 142d may be greater than the first drive envelope width 142a, thereby expanding the area of the road 106 within which the first vehicle 102a may travel in order to reach the destination 124.

As noted above, the path calculator 214 of the first vehicle 102a may determine the fourth drive envelope 138d and/or the prioritized path 708 based at least partly on the set of parameters determined at 808. Alternatively, in some examples, at 808 the computing device 160 and/or other components of the remote vehicle control system 154 may determine a prioritized path 708 extending from the first vehicle 102a to the destination 124 based at least partly on the request received at 804 and on the road network data received at 806. In any of the examples described herein, the first vehicle 102a may be caused to travel along the prioritized path 708, and the prioritized path 708 may be defined, at least in part, by the fourth drive envelope 138d described above may include and/or define such a prioritized path 70.

At 810, the example method 800 may include determining, at the computing device 160 and/or other components of the remote vehicle control system 154, one or more additional sets of modified parameters governing the operation of various remaining vehicles traversing the road network 104. For example, as noted above the second vehicle 102b may be caused to operate in accordance with a second set of nominal operating parameters. In such examples, at 810 the remote vehicle control system 154 may determine a fourth set of modified parameters for operating the second vehicle 102b. The remote vehicle control system 154 may determine the fourth set of parameters based at least partly on the request received at 804 and on the sensor data included in the sensor signals received at 802. Additionally, the fourth set of parameters determined at 810 may be at least partly more restrictive than the second set of parameters governing operation of the second vehicle 102b.

For example, where the second set of nominal operating parameters may define and/or otherwise include a third speed threshold below which the second vehicle 102b is permitted and/or required to operate, the fourth set of modified parameters determined at 810 may include a fourth speed threshold less than the third speed threshold, thereby requiring the second vehicle 102b to travel at a lower speed. As another example, where the second set of nominal operating parameters may define and/or otherwise include a third strut setting, suspension setting, brake pressure setting, turbo setting, engine tuning configuration, and/or other vehicle parameter, the fourth set of modified parameters determined at 810 may define and/or otherwise include a fourth strut setting, suspension setting, brake pressure setting, turbo setting, engine tuning configuration, and/or other vehicle parameter setting causing the second vehicle 102b to operate in a relatively more relaxed or refined drive mode. For example, the third suspension setting of the second set of nominal operating parameters may cause a strut or other suspension component of the second vehicle 102b to operate with a third level of sensitivity, and the fourth suspension setting of the fourth set of modified parameters determined at 810 may cause such a suspension component of the second vehicle 102b to operate with a fourth level of sensitivity less than the third level of sensitivity.

As a further example, and as illustrated in at least FIGS. 7a and 7b, where the second set of nominal operating parameters may be consumed by the path calculator 214 of the second vehicle 102b to generate and/or otherwise determine a second drive envelope 138b (having a second drive envelope width 142b) along which or within which the second vehicle 102b is permitted and/or required to travel, the fourth set of modified parameters determined at 810 may be consumed by the path calculator 214 of the second vehicle 102b to generate and/or otherwise determine a fifth drive envelope 138e (having a fifth drive envelope width 142e) along which or within which the second vehicle 102b is permitted and/or required to travel. In such examples, the fifth drive envelope width 142e may be less than the second drive envelope width 142b, thereby reducing the area of the road 106 within which the second vehicle 102b may travel. In any of the examples described herein, the fourth set of parameters determined at 810 governing operation of the second vehicle 102b may also be at least partly more restrictive than the third set of parameters determined at 808 governing preferential travel of the first vehicle 102a.

As noted above, the path calculator 214 of the second vehicle 102b may determine the fifth drive envelope 138e based at least partly on the set of parameters determined at 810. Alternatively, in some examples, the computing device 160 and/or other components of the remote vehicle control system 154 may determine one or more additional drive envelopes based at least partly on the request received at 804 and/or based at least partly on the road network data accessed at 806. Example first, second, and third drive envelopes 138, 406, 408 are described above with respect to FIGS. 4a and 4b. Additionally, example first second, and third drive envelopes 138, 506, 508 are described above with respect to FIGS. 5a and 5b, and various drive envelopes are also described above with respect to FIGS. 6a, 6b, 7a, and 7b. In any of the examples described herein, a second and/or additional drive envelope determined at 810 may maintain a corresponding second vehicle 102b and/or an additional one of the vehicles 102 outside of one or more trajectories (determined at 808) defining the drive line 146 of the requesting vehicle 102a as the requesting vehicle 102a travels to the particular destination 124 along a prioritized path.

At 812, the example method 800 may include providing, with the computing device 160 and/or other components of the remote vehicle control system 154, a first command signal to at least the requesting vehicle 102a. For example, at 812 the computing device 160 may generate a first command signal including the set of modified parameters determined at 808. As noted above, such a set of parameters may include information indicative of one or more trajectories, a drive line, a prioritized path, one or more drive envelopes, a speed threshold, a suspension setting, and/or other rules or vehicles operating parameters. At 812, the computing device 160 may transfer, send, and/or otherwise provide the first command signal to the requesting vehicle 102a via the network 152 and using, for example, the transmitter 306. Additionally, the network interface 234 of the first vehicle 102a may receive the first command signal at 812, and the first command signal may cause the first vehicle 102a to operate in accordance with the set of modified parameters determined at 808. For example, the vehicle controller 228 may consume and/or otherwise process the first command signal received at 812, and the path calculator 214 of the requesting vehicle 102a may generate and/or otherwise determine a drive envelope defining, at least in part, a prioritized path extending from the requesting vehicle 102a to the destination 124 based at least in part on the set of modified parameters included in the first command signal. The vehicle controller 228 of the requesting vehicle 102a may also cause the requesting vehicle 102a to travel along and/or within the drive envelope when traveling along the prioritized path. In traveling within the drive envelope, the vehicle controller 228 may, in some examples, cause the requesting vehicle 102a to move from a first lane 110a to a second lane 110b, or vice versa. The vehicle controller 228 may also cause the requesting vehicle 102a to make one or more turns, accelerate, decelerate, and/or perform one or more additional vehicle maneuvers in causing the requesting vehicle 102a to travel within the drive envelope and/or along the prioritized path at 812. Additionally or alternatively, causing the first vehicle 102a to operate in accordance with the set of modified parameters included in the first command signal may cause the first vehicle 102a to accelerate from a first speed to a second speed greater than a first speed. The first command signal provided at 812 may also cause a suspension component of the first vehicle 102a to operate with an increased level of sensitivity. Further, the first command signal provided at 812 may cause the first vehicle 102a to travel within an expanded drive envelope and/or to operate within an increased speed threshold.

At 814, the example method 800 may include providing, with the computing device 160 and/or other components of the remote vehicle control system 154, a second command signal to a second vehicle 102b and/or to at least one of the remaining vehicles 102 traversing the road network 104. For example, at 814 the computing device 160 may generate a second command signal including the set of modified parameters determined at 810. Such a set of parameters may include information indicative of a path, drive envelope, speed threshold, suspension setting, and/or other rules or vehicle operating parameters. In some examples, the second command signal may also include information indicative of the one or more trajectories, drive line, drive envelope, prioritized path, and/or other modified parameters determined at 808. In still further examples, the second command signal may also include additional information such as, for example, the unique identifier associated with the requesting vehicle 102a, unique identifiers associated with one or more of the remaining vehicles 102 traversing the road network 104, weather conditions, road conditions, traffic conditions, and/or other parameters associated with the road network 104. At 814, the computing device 160 may transfer, send, and/or otherwise provide the second command signal to at least the second vehicle 102b via the network 152 and using, for example, the transmitter 306. In some examples, at 814 the computing device 160 may also transfer, send, and/or otherwise provide the second command signal to the requesting vehicle 102a via the network 152.

At 814, the vehicle controller 228 of, for example, the second vehicle 102b may receive the second command signal, and the second command signal may cause the second vehicle 102b to operate in accordance with the set of modified parameters determined at 810. For example, the vehicle controller 228 of the second vehicle 102b may consume and/or otherwise process the second command signal received at 814, and the path calculator 214 of the second vehicle 102b may generate and/or otherwise determine a drive envelope 406 (FIG. 4b) based at least partly on the set of modified parameters included in the second command signal. The vehicle controller 228 of the second vehicle 102b may cause the second vehicle 102b to travel within the drive envelope 406. In traveling within the drive envelope 406, the vehicle controller 228 of the second vehicle 102b may, in some examples, cause the second vehicle 102b to move from a first lane 110a to a second lane 110b, or vice versa. The vehicle controller 228 of the second vehicle 102b may also cause the second vehicle 102b to make one or more turns, accelerate, decelerate, and/or perform one or more additional vehicle maneuvers in causing the second vehicle 102b to travel within the drive envelope. In particular, the vehicle controller 228 of the second vehicle 102b may control the second vehicle 102b to remain outside of one or more drive envelopes and/or trajectories (determined at 808) defining the drive line 146 of the requesting vehicle 102a as the requesting vehicle 102a travels to the particular destination 124 along a prioritized path. Additionally or alternatively, causing the second vehicle 102b to operate in accordance with the set of modified parameters included in the second command signal may cause the second vehicle 102b to decelerate from a first speed to a second speed less than the first speed. Further, the second command signal provided at 814 may cause the second vehicle 102b to travel within narrowed and/or otherwise reduced drive envelope and/or to operate within a reduced speed threshold.

At 814, the method 800 may also include providing at least some of the information included in the various command signals via the preferential travel output device 150 of the respective vehicles 102. For example, the vehicle controller 228 of the second vehicle 102b may consume and/or otherwise process the second command signal received at 814, and the vehicle controller 228 of the second vehicle 102b may cause the display and/or other components of the preferential travel output device 150 to display at least part of the prioritized path (e.g., the prioritized path 604 illustrated in FIG. 6b), the drive envelope (e.g., the fourth drive envelope 138d illustrated in FIG. 7b), the drive line (e.g., the drive line 146 illustrated in FIG. 5b), one or more corresponding trajectories, and/or other parameters or sets of parameters. In such examples, the prioritized path 604 and/or the fourth drive envelope 138d may be displayed on and/or with a map or other like illustration of the road 106. In such examples, at least part of the road network 104, the destination 124, and/or other portions of the environment 100 may also be displayed via the preferential travel output device 150. Additionally or alternatively, at least one of the requesting vehicle 102a, the second vehicle 102b, the one or more remaining vehicles 102 traversing the road network 104, an additional drive envelope (e.g., the drive envelope 710 illustrated in FIG. 7b), the unique identifier and/or other information identifying at least one of the vehicles 102 (e.g., the requesting vehicle 102a), and/or one or more of the modified parameters determined at 808 or 810 may also be displayed and/or otherwise provided. It is understood that such information provided by the preferential travel output device 150 may be updated in substantially real time and, the preferential travel output devices 150 in each of the respective vehicles 102 may provide similar and/or the same information.

In any of the examples described herein, the first, second, and/or corresponding additional command signals of the present disclosure may maintain the second vehicle 102b and/or any of the additional vehicles 102 traversing the road network 104 outside of one or more drive envelopes and/or trajectories of the requesting vehicle 102a as the requesting vehicle is traveling along a prioritized path to the destination 124. As noted above, such trajectories may define a drive line 146 of the requesting vehicle 102a, and the drive line 146 may be included in and/or may otherwise define a drive envelope 138 of the requesting vehicle 102a. Such a drive envelope 138 may be included in and/or may define at least part of the prioritized path. In this way, the methods and systems of the present disclosure may be used to provide a requesting vehicle 102a with a prioritized path that extends from the requesting vehicle 102a to the destination 124. As a result, the methods and systems of the present disclosure may enable passengers of vehicles (e.g., passengers of driverless vehicles) to travel to such a destination in an expedited manner in case of emergencies and/or other time-sensitive situations, and such methods and systems may improve passenger satisfaction. Such methods and systems may also result in reduced congestion or traffic in the road network 104 and may, thus, result in more efficient usage of the roads 106, lanes 110, and/or other portions of the road network 104.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A method, comprising:
receiving, at a computing device, signals from a plurality of vehicles, the signals comprising information indicative of a current location of one or more vehicles of the plurality of vehicles;
receiving, at the computing device and from a first vehicle of the plurality of vehicles, a request for preferential travel from a current location of the first vehicle to a particular destination, wherein
the first vehicle is permitted to operate in accordance with a first set of parameters, and
a second vehicle of the plurality of vehicles is permitted to operate in accordance with a second set of parameters;
determining, at the computing device and based at least partly on the request and the signals,
a third set of parameters, the third set of parameters differing from the first set of parameters, and
a fourth set of parameters, the fourth set of parameters requiring the second vehicle to remain outside of a drive envelope of the first vehicle as the first vehicle travels to the particular destination;
providing a first command signal to the first vehicle with the computing device, the first command signal including the third set of parameters; and
providing a second command signal to the second vehicle with the computing device, the second command signal including the fourth set of parameters.

2. The method of claim 1, wherein consumption of the third set of parameters by the first vehicle causes the first vehicle to:
move from a first road lane to a second road lane, and
accelerate from a first speed to a second speed greater than the first speed.

3. The method of claim 2, wherein consumption of the fourth set of parameters by the second vehicle causes the second vehicle to move from the second road lane to either the first road lane or to a third road lane different from the first and second road lanes.

4. The method of claim 1, further comprising providing, with the computing device, an additional command signal to a third vehicle of the plurality of vehicles, the additional command signal including a further set of parameters,
wherein consumption of the further set of parameters by the third vehicle causes the third vehicle to remain outside of the drive envelope of the first vehicle, between the first vehicle and the particular destination.

5. The method of claim 1, wherein the request is generated in response to an input received from a passenger of the first vehicle and via an input device.

6. The method of claim 1, wherein the third set of parameters comprises one or more of a maximum speed, a trajectory, a drive line, or a set of traffic rules.

7. The method of claim 1, further comprising:
accessing, with the computing device, road network data from a road network data store, the road network data being based at least in part on the current location of the one or more vehicles; and
determining the third and fourth sets of parameters further based at least partly on the road network data.

8. The method of claim 1, wherein:
the first set of parameters includes a first suspension setting,
consumption of the first set of parameters by the first vehicle causes a suspension component of the first vehicle to operate with a first level of sensitivity,
the third set of parameters includes a second suspension setting different from the first suspension setting, and
consumption of the third set of parameters by the first vehicle causes the suspension component to operate with a second level of sensitivity greater than the first level of sensitivity.

9. The method of claim 1, wherein:
the drive envelope comprises a first drive envelope having a first envelope width, and
consumption of the third set of parameters by the first vehicle causes the first vehicle to travel within a second drive envelope, the second drive envelope having a second envelope width greater than the first envelope width.

10. The method of claim 1, wherein:
the first set of parameters includes a first speed limit, and
the third set of parameters includes a second speed limit, the second speed limit being greater than the first speed limit.

11. A system for controlling movement of a plurality of driverless vehicles comprising:
a computing device in communication with the plurality of driverless vehicles via a network, the computing device being configured to:
receive a first signal from a first vehicle, the first signal including information indicative of a location of the first vehicle;
receive a second signal from a second vehicle, the second signal including information indicative of a location of the second vehicle;
receive a request for preferential travel from the location of the first vehicle to a particular destination;
determine, based at least partly on the request, the first signal, and the second signal a first set of parameters and a second set of parameters, wherein
the second set of parameters is at least partly more restrictive than the first set of parameters, and
the second set of parameters requires the second vehicle to remain outside of a drive envelope of the first vehicle, between the first vehicle and the particular destination;
provide a first command signal to the first vehicle, the first command signal including the first set of parameters; and
provide a second command signal to the second vehicle, the second command signal including the second set of parameters.

12. The system of claim 11, wherein the first set of parameters and the second set of parameters comprise one or more of a speed limit, a drive envelope width, a set of traffic rules, or a suspension setting.

13. The system of claim 11, wherein the first vehicle comprises an input device configured to receive an input from a passenger of the first vehicle indicative of the request.

14. The system of claim 11, further comprising a road network data store in communication with the computing device, the road network data store including road network data corresponding to the location of the first vehicle and the location of the second vehicle, the computing device being further configured to:
access the road network data from the road network data store, and
wherein to determine the first set of parameters and the second set of parameters is further based at least in part on the road network data,
wherein the road network data comprises one or more of lane widths, speed limits, or a road map.

15. The system of claim 11, wherein the drive envelope of the first vehicle comprises a first drive envelope having a first envelope width, and
consumption of the second set of parameters by the second vehicle causes the second vehicle to travel within a second drive envelope, the second drive envelope having a second envelope width less than the first envelope width.

16. A driverless vehicle in communication with a remote computing device via a network, the vehicle comprising:
a network interface configured to provide a request for preferential travel from a location of the vehicle and information indicative of the location to the remote computing device via the network; and
a vehicle controller configured to operate the vehicle in accordance with a first set of parameters, wherein:
the network interface is further configured to receive a command signal from the remote computing device via the network, the command signal being based at least partly on the request and including a second set of parameters, and
the vehicle controller is further configured to operate the vehicle in accordance with the second set of parameters as the vehicle travels to a particular destination.

17. The driverless vehicle of claim 16, wherein
consumption of the first set of parameters by the vehicle controller causes the vehicle to travel within a first corridor of a road network, the first corridor having a first envelope width, and
consumption of the second set of parameters by the vehicle controller causes the vehicle to travel within a second corridor of the road network, the second corridor having a second envelope width greater than the first envelope width.

18. The driverless vehicle of claim 16, wherein:
the first set of parameters specifies a first region in which the vehicle controller is permitted to control the vehicle to operate,
the second set of parameters specifies a second region in which the vehicle controller is permitted to control the vehicle to operate,
the second region being different than the first region, and
the first set of parameters and the second set of parameters comprise one or more of a speed limit, a set of traffic rules, a suspension setting, or a drive envelope width.

19. The driverless vehicle of claim 16, wherein consumption of the second set of parameters by the vehicle controller causes the vehicle to:
move from a first road lane to a second road lane different from the first road lane,
accelerate from a first speed to a second speed greater than the first speed, and
adjust a suspension of the vehicle.

20. The method of claim 1, wherein the request for preferential travel comprises a setting or a subscription associated with an account of a passenger of the vehicle.

* * * * *